US012596189B2

(12) United States Patent
Antolinos et al.

(10) Patent No.: US 12,596,189 B2
(45) Date of Patent: Apr. 7, 2026

(54) METHOD FOR TRANSFERRING INFORMATION VIA A MOBILE BEACON

(71) Applicant: APITRAK SAS, Meylan (FR)

(72) Inventors: Luc Antolinos, Meylan (FR); Julien Bonnal, Meylan (FR); Yoni Pomares, Meylan (FR); Frédéric Martin, Meylan (FR)

(73) Assignee: APITRAK SAS, Meylan (FR)

( * ) Notice: Subject to any disclaimer, the term of this patent is extended or adjusted under 35 U.S.C. 154(b) by 226 days.

(21) Appl. No.: 18/555,455

(22) PCT Filed: Apr. 15, 2022

(86) PCT No.: PCT/EP2022/060177
§ 371 (c)(1),
(2) Date: Oct. 13, 2023

(87) PCT Pub. No.: WO2022/219184
PCT Pub. Date: Oct. 20, 2022

(65) Prior Publication Data
US 2024/0210551 A1 Jun. 27, 2024

(30) Foreign Application Priority Data

Apr. 16, 2021 (FR) ...................................... 2103948

(51) Int. Cl.
*G01S 13/87* (2006.01)
*G01S 5/02* (2010.01)
*G01S 5/14* (2006.01)
(52) U.S. Cl.
CPC .......... *G01S 13/878* (2013.01); *G01S 5/0268* (2013.01); *G01S 5/14* (2013.01)

(58) Field of Classification Search
None
See application file for complete search history.

(56) References Cited

U.S. PATENT DOCUMENTS

| | | | |
|---|---|---|---|
| 10,817,769 B2 | 10/2020 | Kwang et al. | |
| 2016/0012263 A1* | 1/2016 | Mally | G01S 5/0009 340/10.1 |
| 2016/0103198 A1* | 4/2016 | Swope | G01S 13/75 342/372 |
| 2020/0334393 A1* | 10/2020 | Wodrich | G06F 30/13 |

FOREIGN PATENT DOCUMENTS

| | | |
|---|---|---|
| EP | 3 680 687 A1 | 7/2020 |
| WO | WO 2010/125767 A1 | 11/2010 |
| WO | WO 2018/067765 A1 | 4/2018 |

OTHER PUBLICATIONS

International Search Report as issued in International Patent Application No. PCT/EP2022/060177, dated Jul. 27, 2022.

* cited by examiner

*Primary Examiner* — Thomas S Mccormack
(74) *Attorney, Agent, or Firm* — CUSHMAN PARTNERS

(57) ABSTRACT

A method for transmitting a piece of information from at least one first UWB radio tag by a mobile beacon including transmission and a receiver, includes transmitting a first energizing signal by a transmitter of the mobile beacon; receiving, by the mobile beacon by a UWB receiver, a first UWB signal of at least the first UWB radio tag energized by the first UHF signal; determining a first position piece of data of the mobile beacon by a location system, recording a first decoded tag piece of data of the first received UWB signal in a memory of the mobile beacon.

21 Claims, 4 Drawing Sheets

METHOD FOR TRANSFERRING INFORMATION VIA A MOBILE BEACON

CROSS-REFERENCE TO RELATED APPLICATIONS

This application is the U.S. National Stage of PCT/EP2022/060177, filed Apr. 15, 2022, which in turn claims priority to French patent application number 2103948 filed Apr. 16, 2021. The content of these applications are incorporated herein by reference in their entireties.

The field of the invention relates to the field of methods for transmitting at least one piece of information by means of a communication interface. The field of the invention is more particularly concerned with the field of methods for transmitting one or more data transmitted by a radio tag. Finally, the field of the invention is more specifically concerned with the field of methods for transmitting, by means of a mobile beacon, a location piece of data and at least one piece of data transmitted by a UWB (Ultra-Wide Band) radio tag.

In prior art, different solutions exist to ensure transmission of a piece of data of a UWB signal received. By way of example, application EP3680687 describes a method for determining the location of a UWB tag using a signal exchanged between a fixed beacon and the UWB tag and a method for adapting the signal exchanged according to the position of the UWB tag.

However, a problem persists, on the one hand when the implementation of a fixed detection infrastructure proves unsuitable for the environment or when the UWB tags are located in so-called "shadow zones", which are zones hidden or remote from the detection infrastructure and in which UWB tags cannot be correctly detected or energized. In this respect, there is a real need to implement a solution allowing detection of UWB signals of tags positioned in these 'shadow zones'. There is also a need to implement a UWB signal detection solution in environments where the implementation of a fixed infrastructure is not suitable, for example for reasons of financial costs or because arrangement restrictions do not allow this.

The invention detailed below solves the above drawbacks by providing a mobile UHF (Ultra-High Frequency) energy supply and UWB signal detection solution.

SUMMARY OF THE INVENTION

According to a first aspect, the invention relates to a method for transmitting a piece of information of at least one first UWB radio tag by means of a mobile beacon comprising transmission and reception means, characterized in that it comprises:

Transmitting a first energizing signal by means of a transmitter of an energizing signal of the mobile beacon;

Receiving, by the mobile beacon by means of a UWB receiver, a first UWB signal of at least the first UWB radio tag energized by the first energizing signal;

Recording a first decoded tag piece of data from the first UWB signal received in a memory of the mobile beacon;

Timestamping said reception of the first UWB signal to produce a first timestamping piece of data associated with the first piece of data;

Determining a first position of said mobile beacon by means of a location system;

Associating the first position piece of data of the mobile beacon with said first tag piece of data, said position piece of data making it possible to locate said mobile beacon, Transmitting a first piece of information by the mobile beacon comprising said first tag piece of data and the first timestamping piece of data and transmitting a second piece of information by the mobile beacon comprising the first position piece of data to at least one piece of equipment of a data network.

One advantage is to be able to retrieve and transmit, for example within a data server, different information associated with a radio tag, to identify said radio tag or to associate position of the radio tag with position of the mobile beacon. Another advantage is to be able to use a UHF source to energize a radio tag located in a shadow zone which cannot be detected by a fixed infrastructure.

According to one example, the first energizing signal is a UHF signal and the transmitter of the energizing signal of the mobile beacon is a UHF transmitter.

According to one embodiment, the first piece of information is transmitted to a data server via a Wi-Fi, 4G, 5G or Bluetooth link and the second piece of information is transmitted in the form of a UWB message to a location system including at least one fixed beacon comprising means for receiving UWB signals to calculate the position of the mobile beacon by trilateration, said association between the first position piece of data of the mobile beacon and said first tag piece of data being performed by a data server and making it possible to locate said mobile beacon.

One advantage is to be able to rely on the presence of a fixed UWB detection infrastructure to calculate an accurate position of the mobile beacon in the environment.

According to one embodiment, the method comprises:

Transmitting a second UWB signal by the mobile beacon by means of a UWB transmitter including at least one identification piece of data of said mobile beacon encoded in said second UWB signal;

Receiving the second UWB signal by the location system including a plurality of UWB radio beacons including radio reception means and means for decoding a piece of information and time stamping the arrival of said second UWB signal;

Transmitting a detection piece of information of the second UWB signal to the mobile beacon, Calculating, using all the second signals received by each of the radio beacons, a position of the mobile beacon.

One advantage is to be able to ensure that a UWB signal transmitted by the mobile beacon is actually detected by a plurality of beacons of the infrastructure.

According to one embodiment, the method comprises:

transmitting a plurality of second UWB signals by the mobile beacon by means of a UWB transmitter, each second UWB signal including at least one encoded piece of data for identifying said mobile beacon;

receiving the second UWB signals by the location system including a plurality of UWB radio beacons, said location system comprising radio reception means and means for decoding the identification piece of data and for time stamping arrival of the second UWB signals;

transmitting, to the mobile beacon by the location system, a piece of information of detecting the second UWB signal;

calculating, by means of a plurality of second signals received by each of the radio beacons, the first position piece of data of the mobile beacon.

According to one embodiment, the method comprises:

Transmitting the second UWB signal by the mobile beacon including at least one identification piece of data of said mobile beacon encoded in said second UWB signal, said transmitting automatically generating transmitting the detection piece of information by a UWB system when the latter receives said identification piece of data, Transmitting a plurality of second UWB signals at an increased frequency during a second time interval in case of non-reception of the detection piece of information at the end of a first time interval.

According to one embodiment, the method comprises:

transmitting a second UWB signal by the mobile beacon by means of a UWB transmitter, said second UWB signal comprising at least one encoded piece of data of identifying said mobile beacon, said transmitting resulting in activating a clock to measure a first time interval, transmitting a plurality of second UWB signals at an increased frequency during a second time interval in case of non-reception of a detection piece of information at the end of a first time interval, said detection piece of information indicating detection of the second UWB signal by a UWB reception system.

One advantage is to ensure that the mobile beacon is actually detected by the detection infrastructure when the first UWB signal transmitted has not allowed said detection of the mobile beacon.

According to one embodiment, the first piece of information and the second piece of information are transmitted to a data server by a wireless communication interface, the association between the first position piece of data of the mobile beacon and the first tag piece of data being performed within the mobile beacon, said first position piece of data being transmitted to the mobile beacon by a location system.

One advantage is to be able to associate position of the mobile beacon with position of a UWB tag originating transmitting a UWB signal comprising the first tag piece of data.

According to one embodiment, the first position piece of data is transmitted by:

A reference tag having known position;

A satellite geolocation system;

A geolocation system by geocoder;

A Wi-Fi geolocation system;

A geolocation system by use of a telecommunications operator,

An RFID geolocation system.

One advantage is to be able to adapt the location system to the context in which the mobile beacon operates. For example, a location system comprising a reference tag will be more suitable in an indoor environment than satellite geolocation.

Optionally, the mobile beacon $B_M$ receives the first position piece of data.

According to one embodiment, the method comprises:

Transmitting a third UWB signal comprising a first time piece of information and a second piece of information by at least one UWB radio tag with a known position reference;

Receiving the third UWB signal by the mobile beacon;

Recording the first time piece of information and the second piece of data decoded from the UWB signal received in a memory of the mobile beacon;

Timestamping said reception of the third UWB signal to produce a second timestamping piece of data associated with receiving the time piece of information and the second piece of data, Transmitting a third piece of information comprising the first time piece of information, the second piece of data and the second timestamping piece of data to at least one piece of equipment in the data network.

One advantage is to be able to calculate a travel time of a UWB signal between a reference tag having known position and the mobile beacon.

According to one embodiment, the method comprises:

receiving, by the mobile beacon and by means of a UWB receiver, a third UWB signal transmitted by at least one reference UWB radio tag having known position, said third UWB signal comprising a first encoded time piece of information of time stamping the transmission of said third UWB signal and comprising a second encoded identification piece of data of the reference UWB radio tag;

time-stamping said reception of the third UWB signal to produce a second piece of data of timestamping reception of the time piece of information and the second piece of data, recording the first decoded time piece of information and the second decoded identification piece of data in a memory of the mobile beacon;

transmitting, by the mobile beacon, a third piece of information comprising the first time piece of information, the second piece of data and the second timestamping piece of data to at least one piece of equipment of the data network.

According to one embodiment, the method comprises:

Transmitting, by the mobile beacon and by a plurality of UWB radio beacons, a plurality of third pieces of information each comprising the first time piece of information, the second piece of data and a timestamping piece of data by means of a communication interface to at least one piece of equipment of the data network;

Determining for the mobile beacon and for each UWB radio beacon a propagation time piece of information of each third UWB signal, said propagation time piece of information being determined on the basis of the first time piece of information and the timestamping piece of data;

Comparing the propagation time information of each third UWB signal by means of a comparator, Synchronizing the clocks of the mobile beacon and the UWB radio beacons with each other according to the propagation time information of each third UWB signal One advantage is to synchronize clocks of a plurality of mobile or fixed beacons to allow implementation of position calculations by trilateration.

According to one embodiment, the method comprises:

transmitting, by the mobile beacon and by a plurality of UWB radio beacons, a plurality of third pieces of information via a communication interface and to at least one piece of equipment of the data network;

calculating, for the mobile beacon and for each UWB radio beacon and by means of a calculator, a propagation time piece of information of each third UWB signal, each propagation time piece of information being calculated from each first time piece of information and each second timestamping piece of data;

comparing, by a comparator, the propagation time information of each third UWB signal, synchronizing a clock of the mobile beacon and a clock of each UWB radio beacon between them according to the result of comparisons of the propagation time information.

According to one embodiment, the method comprises implementing at least one calculation of a relative position of at least the first UWB radio tag per trilateration, said calculation being implemented by means of a calculator on the basis of at least one first UWB signal transmitted by the first UWB radio tag and received by the mobile beacon and by at least two UWB radio beacons.

According to one embodiment, the method comprises implementing, by means of a calculator, at least one calculation by trilateration of a relative position of the first UWB radio tag, from the first UWB signal transmitted by said first UWB radio tag and received by the mobile beacon and by at least two other UWB radio beacons.

One advantage is to use the mobile beacon to perform at least one calculation of a position of an object by trilateration when the position of said mobile beacon is known.

According to one embodiment, the method comprises

Receiving a first amount of UHF energy by the mobile beacon by means of a UHF receiver;

Comparing, by means of a comparator, the first amount of UHF energy received with a predetermined threshold energy value;

Transmitting the first energizing UHF signal using the UHF transmitter by the mobile beacon if the first amount of UHF energy received is below the predetermined threshold energy value, Reducing the energy transmitted by the UHF transmitter of the mobile beacon if the first amount of UHF energy received exceeds the predetermined threshold energy value.

One advantage is to be able to "map" the UHF energy of several zones and supply the weakest supplied zones with UHF energy. Advantageously, transmitting the first UHF signal may result in transmitting UWB signals by tags present in the initially low-energized zone.

According to one embodiment, the method comprises:

Measuring a distance value between an object and the mobile beacon by means of a distance sensor;

Comparing the distance value measured with a predetermined threshold distance value, Modulating transmission of the first UHF energizing signal by the UHF transmitter of the mobile beacon if the distance value measured is below the predetermined threshold distance value.

Advantageously, overall energy consumption can be reduced by reducing the transmitted signal power when the UHF energy supply source is close to a UWB radio tag to be energized.

According to one embodiment, the first UWB signal received is associated with a context piece of information, said context piece of information being processed by processing means to determine an identification piece of data of at least one mobile beacon having transmitted a first UHF energizing signal originating the transmission by the first UWB radio tag of said first UWB signal received by the mobile beacon.

According to one embodiment, the first UWB signal received by the mobile beacon is associated with a context piece of information corresponding to a piece of information on the environment in which the mobile beacon operates, and in which the first piece of information transmitted to the equipment of a data network comprises the context piece of information, the context piece of information being processed by processing means to determine an identification piece of data of the mobile beacon having transmitted the first energizing signal originating transmission by the first UWB radio tag of said first UWB signal received by said mobile beacon.

One advantage is to be able to precisely identify a mobile beacon according to different physical parameters measured, for example, by means of sensors.

According to another aspect, the invention relates to a mobile beacon comprising transmission and reception means configured to implement the method according to any of the aforementioned embodiments.

According to another aspect, the invention relates to a mobile beacon comprising means for transmitting an energizing signal, means for receiving UWB signals, a calculator, and a memory, and configured to implement the method according to any of the aforementioned embodiments.

According to one embodiment, the mobile beacon comprises at least two transmission antennas, each transmission antenna being configured to transmit at least one portion of the first energizing UHF signal. One advantage is to be able to supply a plurality of radio tags, each located at different positions, with UHF energy. Another advantage is to increase the UHF coverage of the mobile beacon when controlling directionality of the UHF beam is made difficult by the hardware configuration, for example when the mobile beacon is mounted to a mobile cart.

According to another aspect, the invention relates to a mobile cart including a mobile beacon according to any of the aforementioned embodiments.

According to another aspect, the invention relates to an element embedded by a user comprising a mobile beacon.

According to another aspect, the invention relates to a system comprising a mobile beacon according to any of the aforementioned embodiments and including at least one first UWB radio tag.

Optionally, the first radio tag is configured to transmit the first UWB signal.

BRIEF DESCRIPTION OF THE FIGURES

Other characteristics and advantages of the invention will become clearer upon reading the following detailed description, in reference to the appended figures, that illustrate.

DETAILED DESCRIPTION

Figure 1:
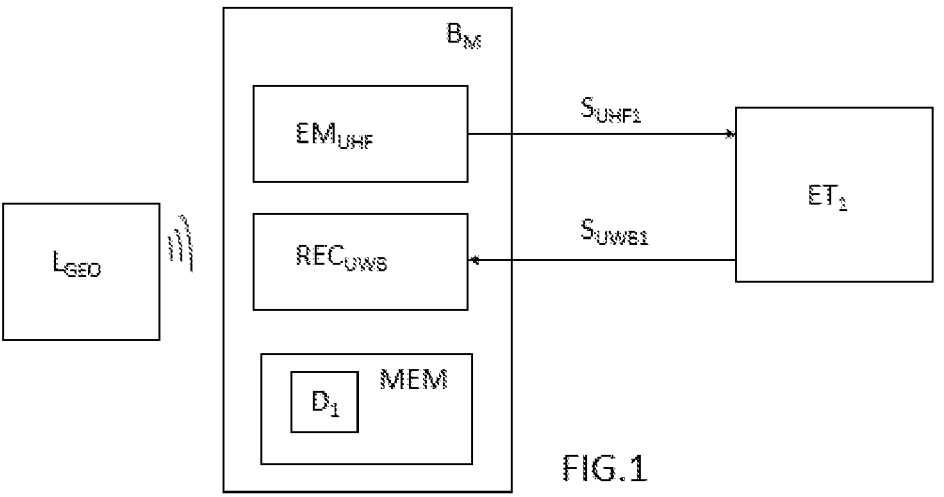
FIG. 1: A flowchart of the method according to the invention when it comprises storing a first piece of data in a memory of the mobile beacon.

FIG. 1 describes a method for transmitting a piece of information of at least one first radio tag UWB by means of a mobile beacon $B_M$ according to a first aspect of the invention when the mobile beacon $B_M$ comprises transmission and reception means.

UHF Transmitter of the Mobile Beacon

According to one embodiment, the mobile beacon $B_M$ comprises an energy transmitter. The energy transmitter is, for example, a UHF (ultra-high frequency) transmitter $EM_{UHF}$. In the remainder of the description, the energy transmitter of the mobile beacon $B_M$ will be described with the example of a UHF transmitter. However, any type of transmitter intended to provide energy at various frequencies to supply a receiver is likely to be implemented within the scope of the invention. The UHF transmitter $EM_{UHF}$ is configured to transmit a first energizing UHF signal $S_{UHF1}$. According to one example, the first UHF signal $S_{UHF1}$ is transmitted at radio frequencies between 25 MHz and 5 GHZ and more particularly in the range from 225 MHz to 3400 MHZ. According to various examples, the frequency range operated comprises a WI-FI range or even an RFID (Radio Frequency Identification) range. More generally, any available frequency range having power is likely to be operated.

According to one embodiment with reference to FIG. 1, the UHF transmitter is configured to transmit the first UHF signal $S_{UHF1}$ toward a first radio tag $ET_1$. The first radio tag $ET_1$ then comprises reception means for receiving said energizing signal $S_{UHF1}$. One advantage is to provide radio-electric energy to the radio tag to enable it to transmit a signal, in particular a UWB signal when the tag comprises UWB transmission means.

According to one embodiment, the UHF transmitter $EM_{UHF}$ comprises a plurality of transmission antennas. For example, each transmission antenna is oriented in a different direction than the other transmission antennas. According to one alternative, the transmission antennas are oriented in the same direction. Each transmission antenna is configured to transmit at least one part of the energizing UHF signal $S_{UHF1}$.

One advantage is to be able to provide UHF energy to multiple radio tags, each located in different positions. Another advantage is to increase the UHF coverage of the mobile beacon when controlling the UHF beam directionality is made difficult by the hardware configuration, for example when the mobile beacon is made integral with an element likely to move such as a mobile cart.

In one embodiment, the plurality of transmission antennas comprises a phased-array antenna. The phases of the signals supplying each of the antennas can be adjusted, for example to obtain a specific radiation diagram.

In one embodiment, the power of the UHF signal delivered by each of the antennas is modulable. By "Modulable", it is meant that the intensity or power of the UHF signal delivered by one of the antennas can be controlled, for example by control means. The control means can be controlled by a user. Controlling by a user is for example implemented by means of a user interface of an electronic device comprising the mobile beacon $B_M$ or paired with said mobile beacon $B_M$. In one embodiment, the control means are configured to control at least one transmission antenna. By "control", it is meant both "modulating the UHF signal delivered by a transmission antenna" and shutting down a transmission antenna. By "shutting down", it is meant that a transmission antenna no longer delivers the first energizing UHF signal $S_{UHF1}$. This configuration is particularly advantageous for concentrating the first UHF signal $S_{UHF1}$ at the output of a single transmission antenna when a UWB tag is facing said transmission antenna. The position of the mobile beacon $B_M$ can then advantageously be associated with the position of the tag originating the transmission of said UWB signal.

In one embodiment, each antenna of the plurality of transmission antennas is configured to deliver part of the first energizing UHF signal $S_{UHF1}$. This is particularly advantageous to allow a wider UHF coverage in the transmission zone, especially when a UWB tag to be energized has not yet been located.

UWB Receiver of the Mobile Beacon

According to one embodiment, the mobile beacon $B_M$ comprises a UWB (Ultra-Wide Band) receiver $REC_{UWB}$. The UWB receiver $REC_{UWB}$ is capable of receiving at least one UWB signal. The UWB signal received may for example be a first signal UWB signal $S_{UWB1}$ from the first UWB tag $ET_1$ energized by the first UHF signal $S_{UHF1}$.

One advantage is to be able to associate position of the first UWB tag $ET_1$ originating the transmission of the UWB signal $S_{UWB1}$ with a position of the mobile beacon $B_M$. Another advantage is to be able to determine movement of the mobile beacon $B_M$ according to the transmission frequency of the first UWB tag $ET_1$. For example, the increase in the transmission frequency of the first UWB tag $ET_1$ can be associated with the mobile beacon BM moving closer to said first UWB tag $ET_1$ and the decrease in the transmission frequency of the first UWB tag $ET_1$ can be associated with the mobile beacon $B_M$ moving away from said first UWB tag $ET_1$.

In one embodiment, the UWB receiver $REC_{UWB}$ of the mobile beacon $B_M$ comprises at least one receiving antenna UWB. Each receiving antenna UWB may be oriented at a predetermined angle relative to the direction along which any of the other receiving antennas UWB extends. One advantage is to improve reception of the UWB signals by the UWB receiver $REC_{UWB}$ of the mobile beacon, in particular by increasing the reception spatial coverage of the receiving antennas UWB. Another advantage is to be able to determine more precisely position of a UWB tag according to the angle of arrival of the UWB signal transmitted by said UWB tag and received by at least one receiving antenna of the UWB receiver of the mobile beacon.

In one embodiment, the UWB receiver $REC_{UWB}$ of the mobile beacon $B_M$ comprises a phased-array antenna. This embodiment is particularly advantageous for obtaining spatial selectivity on radio signals by "beamforming" or "spatial filtering". These expressions are better known in Anglo-Saxon literature as beamforming.

According to one embodiment, the mobile beacon $B_M$ comprises a calculator. The calculator is configured to calculate, for each receiving antenna of the UWB receiver $REC_{UWB}$ of the mobile beacon $B_M$, power of the first UWB signal $S_{UWB1}$ received. One advantage is to be able to correlate power received by each antenna with the angle of arrival of the first UWB signal $S_{UWB1}$ received to improve locating the UWB tag originating the transmission of said first UWB signal $S_{UWB1}$.

In one embodiment, transmitting the first signal $UHF_1$ by the UHF transmitter $EM_{UHF}$ of the mobile beacon causes the reception of the first UWB signal $S_{UWB1}$ by the UWB receiver $RE_{UWB}$ of the mobile beacon $B_M$. According to one illustrative example, the first UHF signal $S_{UHF1}$ transmitted is then received by the first UWB tag $ET_1$ which then automatically, and preferably spontaneously, transmits the first UWB signal $S_{UWB1}$ in response to the energy input provided by receiving the first UHF signal $S_{UHF1}$. The spontaneous transmission of a UWB signal by the UWB tag $ET_1$ is triggered as soon as a sufficient level of radio frequency energy is collected. The first UWB signal $S_{UWB1}$ transmitted by the first UWB tag $ET_1$ is then received by the UWB receiver $REC_{UWB}$ of the mobile beacon $B_M$.

First Tag Piece of Data D1

According to one embodiment, the first UWB signal $S_{UWB1}$ comprises a first tag piece of data $D_1$. The first tag piece of data $D_1$ further comprises information specific to the first tag $ET_1$ originating the transmission of the first UWB signal $S_{UWB1}$. The information included in the first piece of data $D_1$ includes, for example, position of the first tag $ET_1$ or even information on an object to which said first tag $ET_1$ is affixed, for example a parcel or luggage.

The first tag piece of data $D_1$ received by the mobile beacon $B_M$ is recorded in a memory MEM of the mobile beacon $B_M$. The reception of the first UWB signal $S_{UWB1}$ comprising the first tag piece of data $D_1$ is timestamped to produce a first timestamping piece of data $H_1$ associated with said first piece of data $D_1$.

Identification of the Mobile Beacon Position

Figure 2:
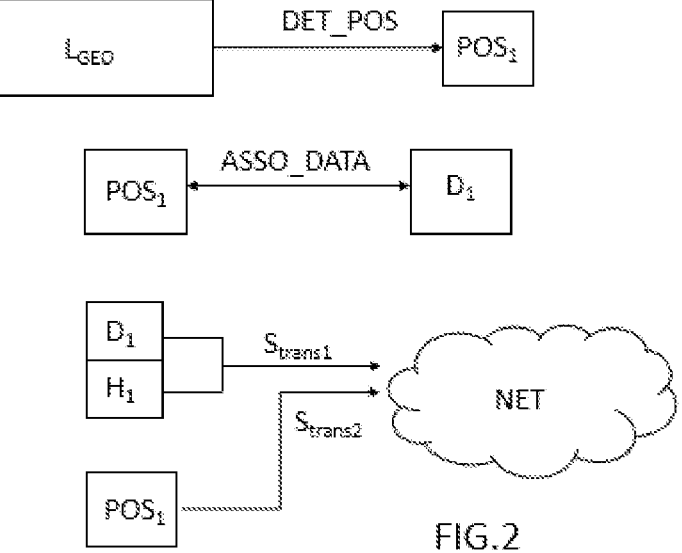
FIG. 2: A flowchart of the method according to the invention when it comprises transmitting a plurality of pieces of information to a piece of equipment of a data network.

With reference to FIG. 2, the invention aims to associate position of the mobile beacon $B_M$ with a first piece of data $D_1$ transmitted by a radio tag. The association can be carried out deferred or in real time depending on the system implemented. Thus, it is possible to deduce position of the first radio tag $ET_1$ from the calculated position of the mobile beacon that "saw" the tag that is ultimately being sought to be located.

To achieve this result, the invention allows the position of the mobile beacon $B_M$ to be measured or calculated. Different locating techniques can be implemented. These different locating techniques may involve the mobile beacon playing a more or less active role in the production of data for locating it. According to some cases, the beacon does not know its position but transmits data enabling it to be located by a third-party system. In some cases, the mobile beacon $B_M$ calculates or receives its position so as to associate it directly with the first piece of data $D_1$ transmitted by the tag $ET_1$.

In the remainder of the description, different locating systems are described according to different embodiments of the invention.

Associating Position of the Mobile Beacon and of the Radio Tag

In one embodiment, the first position piece of data $POS_1$ is associated with the position of at least one UWB tag energized by the first UHF energizing signal $S_{UHF1}$. The association can be performed within the memory MEM of the mobile beacon $B_M$. In this case, the data associated can be transmitted in real time or delayed by the beacon to a third-party system. Association can also be carried out within a piece of equipment of a data network NET. This a posteriori association involves data transmission and processing for reconstructing the association context between the mobile beacon $B_M$ and the first UWB tag $ET_1$. For example, timestamping, position, or other data used to a posteriori calculate the position of the UWB tag $ET_1$.

Location System

The position of the mobile beacon $B_M$ is determined by means of a location system $L_{GEO}$.

According to one embodiment, the location system $L_{GEO}$ comprises means for transmitting a first position piece of data POS1 of the mobile beacon $B_M$ which can be operated by a system. Operating may comprise reconstructing a position, associating a first position piece of data $POS_1$ of the mobile beacon $B_M$ with a tag piece of data or retransmitting said first position piece of data $POS_1$ to the mobile beacon $B_M$ or to a server for a posteriori operating this piece of data.

Different locating techniques can be implemented. For example, the location system $L_{GEO}$ may comprise a reference tag $ET_{ref}$ having known position or a satellite positioning system, also called GNSS (Global Navigation Satellite System). According to various non-limiting examples, the GNSS system comprises a GPS, GLONASS, BEIDU or Galileo system.

In one embodiment, the GNSS system is coupled to a positioning improvement system. According to various examples cited by way of non-limiting purposes, the positioning improvement system comprises a system of the SBAS type, or even a GBAS system. In some cases, such a system operates connectivity of the mobile beacon $B_M$ (4G, Wi-Fi, LoRa, etc.)

Other location techniques may be implemented. For example, the location system $L_{GEO}$ may comprise a geocoder geolocation system, a Wi-Fi geolocation system, a geolocation system by the use of a telecommunication operator, an odometry location system, or even a Radio Frequency Identification (RFID) geolocation system. According to different examples, the location system by using a telecommunications operator comprises, for example, the use of a LoRa technology or even a GSM ("Global System for Mobile communications") technology.

In one embodiment, the location system $L_{GEO}$ comprises a "quick response code", or even "QR code". For example, this quick response code is positioned in the detection environment to a position known to the system. According to different non-limiting examples, the code is positioned on a wall, floor, ceiling, crate, or any other fixed position element in the detection enviornment.

In one case, the location system $L_{GEO}$ comprising said quick response code is scanned by a device configured to decode information contained in said code. Such a device is for example embedded by a user or embedded by the mobile beacon $B_M$. In this case, the scanned information is then transmitted to the equipment of the data network NET by means of the communication interface INTc.

Advantageously, a link can then be established between the decoded and transmitted information and the geographical position of the code known by the system to deduce position of the user or of the mobile beacon $B_M$ which scans said code.

In one embodiment, the quick response code contains location data. These data include, for example, terrestrial coordinates corresponding to the position of said code in the location environment. In this case, a user or a mobile beacon $B_M$ embedding a scanner to decode said code can transmit the scanned data to a piece of equipment on the data network NET, for example by means of the communication interface INTC. Advantageously, it is not necessary to make the link between the transmitted data and a position known to the system in that the transmitted information already includes the position data of said code.

According to different embodiments, the quick response code is scanned by means of different sensors such as sensors comprising laser technologies, optical sensors for example by means of a camera. These examples are not limiting and any type of technologies comprising means for decoding data stored in a quick response code are likely to be implemented in the scope of the invention.

In one example, a video acquisition system comprising a camera is implemented to acquire an image or a video sequence of a zone of the detection environment comprising a location system $L_{GEO}$ comprising a quick response code. The video acquisition system is for example embedded by the mobile beacon $B_M$, by a mobile cart embedding the mobile beacon $B_M$ or by a user.

Thus, the "view angle" of the image or video sequence acquired on which one or more quick response codes appear advantageously makes it possible to determine or confirm a position of the mobile beacon $B_M$ or the user, or to determine an orientation piece of information.

According to another embodiment, the mobile beacon $B_M$ comprises a camera configured to detect particular wavelengths, for example an infrared camera. For example, the camera is embedded on a mobile beacon $B_M$ itself embedded by a user. For example, the camera is positioned on the top of the mobile beacon $B_M$. In one case, the camera senses specific wavelengths from sources positioned in specific zones. The mobile beacon $B_M$ equipped with the camera can then recognize particular patterns or particular wavelengths to determine its position. In another example, an image or video sequence acquired by the camera is operated and analyzed using a calculator to determine a position, orientation, or path of the mobile beacon $B_M$ as a function of time.

However, the elements included in the location system $L_{GEO}$ are not limited to the above-mentioned examples and may comprise any type of elements capable of contributing to the location of an object in space; or even a combination of these different elements, for example to improve accuracy of the location or cover a larger zone than with a single location technique.

Location by a UWB System (Fixed Beacons)

In one embodiment, the position of the mobile beacon $B_M$ is calculated by trilateration by a plurality of beacons. These beacons are also called "fixed beacons" to differentiate them from the mobile beacon $B_M$.

Each beacon includes UWB reception means configured to receive at least one second UWB signal $S_{UWB2}$ transmitted by the mobile beacon $B_M$. For example, the second UWB signal $S_{UWB2}$ comprises at least one identification piece of data of the mobile beacon $B_M$ encoded in said second UWB signal $S_{UWB2}$. This configuration is particularly advantageous for locating the mobile beacon $B_M$ in an indoor environment, particularly when a detection architecture comprising a plurality of beacons is set up and localization by another system such as a GNSS system is not suitable.

In one embodiment, the mobile beacon $B_M$ is configured to transmit the second UWB signals $S_{UWB2}$ several times. The successive transmissions allow ensuring reception of said second UWB signal $S_{UWB2}$ by the fixed beacons in order to increase probability of detection of the mobile beacon. According to one case, the transmissions of the mobile beacon are performed according to a periodic frequency. This case may be implemented in particular when the mobile beacon includes a battery enabling it to make use of sufficient electric energy to generate successive transmissions. Advantageously, the detections of the second signals $S_{UWB2}$ successively by a plurality of beacons present in the detection environment are improved, thus improving the location accuracy of the mobile beacon $B_M$ in the detection environment.

In another embodiment, time filtering is implemented on the second UWB signals $S_{UWB2}$ transmitted successively by the mobile beacon $B_M$. One advantage is to oversample the calculated position from said second UWB signals $S_{UWB2}$, for example to eliminate a location noise.

According to one exemplary embodiment, the plurality of beacons is configured to calculate position of the mobile beacon $B_M$ by trilateration to produce the first position piece of data $POS_1$. The first position piece of data $POS_1$ can then be operated in different ways so that it is associated with the first tag piece of data $D_1$. The association can be made:

- at a fixed beacon when the first tag piece of data $D_1$ is retrieved by the latter.
- at a third-party piece of equipment such as a server when the latter receives by the UWB location system the first position piece of data $POS_1$ and receives by another data transmission system the first tag piece of data $D_1$.
- at the mobile beacon $B_M$ when the position of beacon $B_M$ calculated by trilateration is retransmitted to the mobile beacon $B_M$.

In a first case, the association between the first tag piece of data $D_1$ and the first position piece of data $POS_1$ is carried out at a fixed beacon. In this first case, the second UWB signal $S_{UWB2}$ is transmitted by the mobile beacon $B_M$ and includes the first tag piece of data $D_1$ and the first time-stamping piece of data $H_1$. The second UWB signal $S_{UWB2}$ is then received by a fixed beacon or a plurality of fixed beacons. The position of the mobile beacon $B_M$ is calculated by trilateration by the plurality of fixed beacons to produce the first position piece of data $POS_1$. The first position piece of data $POS_1$ is then associated with the first tag piece of data $D_1$ within a memory of one of the fixed beacons.

In a second case, the association between the first tag piece of data $D_1$ and the first position piece of data $POS_1$ is performed at a third-party piece of equipment such as a piece of equipment of a data network NET. In this case, the first position piece of data $POS_1$ is calculated by trilateration by a plurality of beacons and the first position piece of data $POS_1$ is then transmitted by the plurality of beacons to the piece of equipment of the data network NET. The first piece of information $S_{trans1}$ comprising the first tag piece of data $D_1$ as well as the first timestamping piece of data $H_1$ is transmitted by the mobile beacon $B_M$ to the piece of equipment of the data network NET. Thus, the association between the first position piece of data $POS_1$ calculated by trilateration by the plurality of fixed beacons and the first tag piece of data $D_1$ transmitted by the mobile beacon $B_M$ can be a posteriori carried out retrospectively at the piece of equipment of the data network NET.

In a third case, the association between the first position piece of data $POS_1$ and the first tag piece of data $D_1$ is performed within the mobile beacon $B_M$. In this case, the first position piece of data $POS_1$ can come from different sources. The first position piece of data $POS_1$ can come from a reference tag having known position $ET_{ref}$ and transmitted within a UWB signal to the mobile beacon $B_M$ after said reference tag $ET_{ref}$ has been energized by the UHF transmitter $EM_{UHF}$ of the mobile beacon $B_M$. According to different embodiments, the reference tag $ET_{ref}$ is supplied by an electric energy storage device such as a battery, by an AC/DC power supply or even by an external DC power supply such as, for example, a "Power Over Ethernet" (POE). However, the above examples are given by way of indicating and in no way limiting purposes. More generally, any type of power supply is likely to be implemented to supply the reference tag $ET_{ref}$. According to other examples, the first position piece of data $POS_1$ comes from a GNSS location system or even from a plurality of fixed beacons having calculated position of the mobile beacon by trilateration. Generally speaking, in this third case, the first position piece of data $POS_1$ may come from any of the location systems $L_{GEO}$ described previously. The association between the first tag piece of data $D_1$ and the first position piece of data $POS_1$ is then performed in the memory MEM of the mobile beacon $B_M$. The mobile beacon $B_M$ can then advantageously transmit the first piece of information $S_{trans1}$ comprising the first tag piece of data $D_1$ associated with said first position piece of data $POS_1$ to a piece of equipment of a data network NET.

Location by a Sensor Located on the Mobile Beacon

In one embodiment, the first position piece of data $POS_1$ is determined from one or more sensors embedded by the mobile beacon $B_M$. The sensors embedded by the mobile beacon $B_M$ may include, for example, an inertia unit or a laser rangefinder. However, sensors used to determine the position of the mobile beacon $B_M$ are not limited to the aforementioned examples and may comprise any other type of sensor or a combination of several sensors together. One advantage is to obtain a piece of information on the position of the mobile beacon $B_M$ when the use of other location systems is not optimized, for example when the beacon is in an indoor environment and the use of a GNSS system is unsuitable. Another advantage is to be able to combine the information from the sensors with other information from other location systems to improve accuracy of locating the mobile beacon $B_M$.

In one embodiment, the first position piece of data $POS_1$ comprises a piece of information from at least one sensor embedded by the mobile beacon $B_M$ and a piece of information from a signal received by the mobile beacon $B_M$. For example, the signal received may comprise the first UWB signal $S_{UWB1}$ from the first UWB tag $ET_1$ located in proximity to the mobile beacon $B_M$. According to one example, an association of the piece of information from the at least one sensor embedded by the mobile beacon $B_M$ and the signal received by said mobile beacon is performed within the memory MEM of the mobile beacon $B_M$. Advantageously, accuracy of the calculation of the position of the mobile beacon $B_M$ is improved. Another advantage is to be subsequently able to use the mobile beacon $B_M$ whose position is precisely known within a constellation of beacons to implement position calculations by trilateration.

Detection of the UWB Signal Transmitted by the Mobile Beacon

Figure 3:
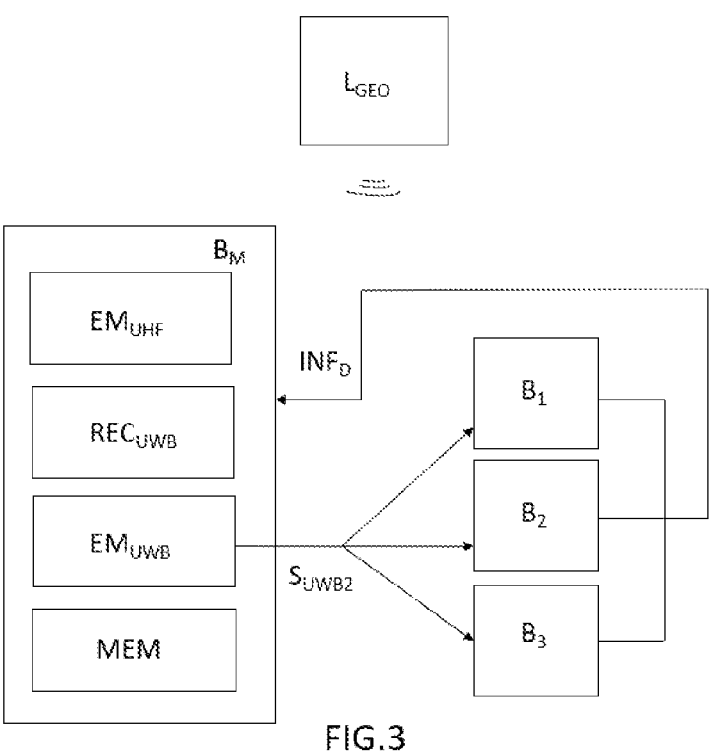
FIG. 3: A flowchart of the method according to the invention when it comprises receiving a detection piece of information by the mobile beacon.

In one embodiment, with reference to FIG. 3, the second UWB signal $S_{UWB2}$ transmitted by the mobile beacon $B_M$ is received by the location system $L_{GEO}$ comprising the plurality of beacons. The plurality of beacons comprises radio reception means, means for decoding a piece of information and means for timestamping arrival of the UWB signal $S_{UWB2}$. The plurality of beacons is configured to transmit a detection piece of information $INF_D$ of the second UWB signal $S_{UWB2}$ to a third-party piece of equipment or to the mobile beacon $B_M$. The detection piece of information may be an acknowledgement transmitted to the mobile beacon and/or may be a piece of information relating to the quality of reception of the signal received by a fixed beacon and retransmitted to the mobile beacon $B_M$ or to a third-party piece of equipment.

When the detection piece of information $INF_D$ is transmitted to the beacon, it may further comprise a piece of information, by the plurality of beacons, of receiving the UWB signal $S_{UWB2}$ previously transmitted by the mobile beacon $B_M$. One advantage is to know whether the signal transmitted by the mobile beacon $B_M$ is actually detected by the plurality of beacons.

Figure 4:
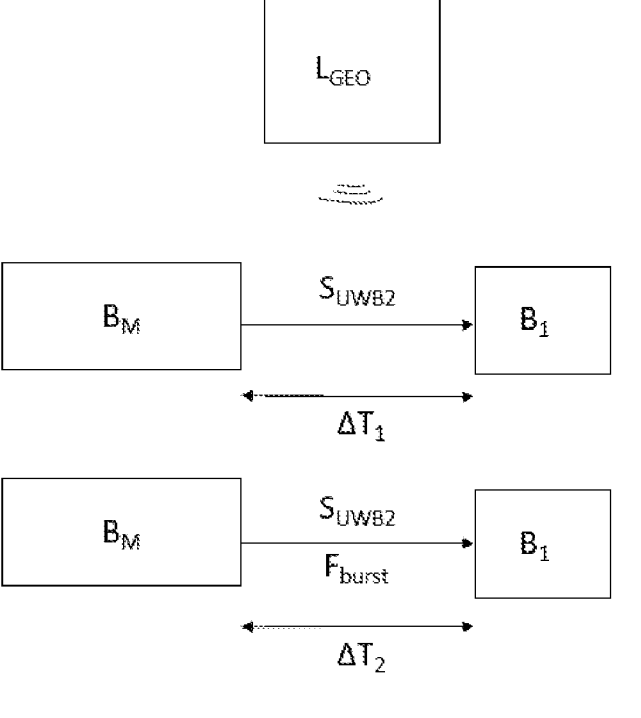
FIG. 4: A flowchart of the method according to the invention when it comprises transmitting a plurality of UWB signals at an increased frequency.

In one embodiment, with reference to FIG. 4, the mobile beacon $B_M$ is configured to transmit a plurality of second UWB signals at an increased frequency $F_{burst}$ in case of non-reception of the detection piece of information $INF_D$. Transmission of the plurality of UWB signals can occur in case of non-reception of the detection piece of information $INF_D$ after a first time interval $\Delta T_1$. The transmission of the plurality of second UWB signals can take place during a second time interval $\Delta T_2$. The two time intervals $\Delta T_1$ and $\Delta T_2$ may have been parameterized upstream by a user, for example, using a configuration console for configuring transmission variables of the beacon. Transmission of the plurality of UWB signals at the increased frequency $F_{burst}$ can also come from a command sent by a piece of equipment of a data network NET. One advantage is to ensure detection of the mobile beacon $B_M$ by a beacon or a constellation of beacons when the first second UWB signal $S_{UWB2}$ has not been detected first.

In one alternative, transmission of the plurality of second UWB signals ends when the mobile beacon $B_M$ receives the detection piece of information $INF_D$.

Synchronization of Clocks of the Beacons and Position Calculation

The invention makes it possible to take account of a synchronization signal generated by reference equipment, the relative position towards reception beacons or fixed beacons of which is known. This last signal makes it possible to synchronize the different beacons with each other in order to minimize errors and to precisely calculate the position of a mobile beacon $B_M$ and therefore the radio tag whose position is sought to be obtained via the mobile beacon $B_M$.

Different synchronization techniques may be used within the scope of the invention. According to one example, this signal can be transmitted from a reference radio tag $ET_{ref}$ whose position is known to the system.

Figure 5:
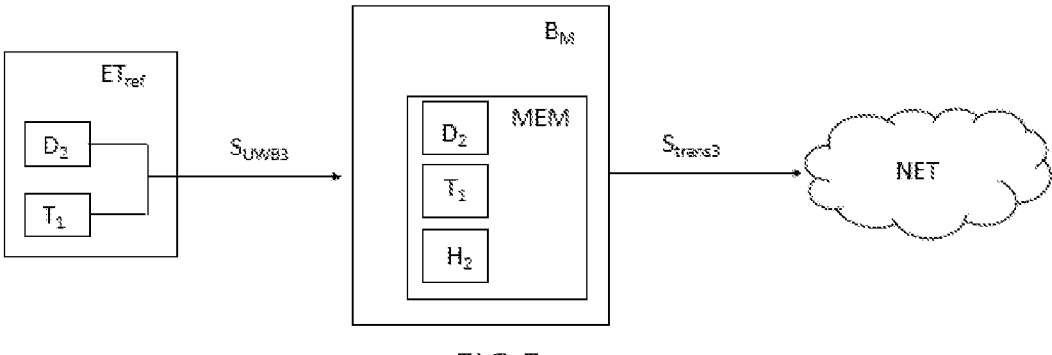
FIG. 5: A flowchart of the method according to the invention when it comprises receiving a UWB signal transmitted by a reference tag.

According to one embodiment, with reference to FIG. 5, the method according to the invention comprises transmitting, by a reference tag $ET_{ref}$, a third UWB signal $S_{UWB3}$ comprising a first time piece of information $T_1$ and a second tag piece of data $D_2$. Transmitting the third UWB signal $S_{UWB3}$ is conditioned by the power supply of said reference tag $ET_{ref}$ by an energy source. According to various examples, the energy supply source implemented to supply the reference tag $ET_{ref}$ comprises a UHF source or an electric energy supply source such as a battery or even an external source. The external source is, for example, AC/DC power supply, power supply via Ethernet cable or power supply via solar panels. In one alternative, the energy supply source of the reference tag $ET_{ref}$ comprises a combination of several of these technologies. In one example, the UHF energy source is the UHF transmitter $EM_{UHF}$ of the mobile beacon $B_M$. The time piece of information $T_1$ comprises, for example, timestamping of the transmission of the third UWB signal $S_{UWB3}$. The second tag piece of data $D_2$ comprises, for example, a piece of information on the position of the reference tag $ET_{ref}$ or even an identification piece of information of said reference tag $ET_{ref}$.

According to one embodiment, the third UWB signal $S_{UWB3}$ is received by the mobile beacon $B_M$ by means of the UWB receiver $REC_{UWB}$. Receiving said third signal $S_{UWB3}$ is then timestamped to produce a second timestamping piece of data $H_2$ associated with receiving, by the mobile beacon $B_M$ of the second tag piece of data $D_2$ and the first timestamping piece of data $D_1$. In this case, the mobile beacon $B_M$ can then transmit a third piece of information $S_{trans3}$ comprising the first time piece of information $T_1$, the second tag piece of data $D_2$ and the second timestamping piece of data $H_2$ to at least one piece of equipment of a data network NET. One advantage is to be able to deduce, from the first time piece of information $T_1$ and the second timestamping piece of data $H_2$, the travel time of the signal transmitted by the reference tag $ET_{ref}$ to the mobile beacon $B_M$.

The synchronization signals can be directly operated by the beacons or a posteriori operated by a third-party piece of equipment in order to reconstruct positions of the mobile beacon $B_M$ and/or the radio tag $ET_1$. In one embodiment, the mobile beacon $B_M$ and a plurality of UWB radio beacons are configured to each transmit a third piece of information $S_{trans3}$. Each third piece of information $S_{trans3}$ comprises the first time piece of information $T_1$ comprising timestamping of the transmission of the third UWB signal $S_{UWB3}$ from the reference tag $ET_{ref}$. Each third piece of information $S_{trans3}$ also includes the second piece of data $D_2$ and a timestamping piece of data, said timestamping piece of data comprising timestamping, for each of the beacons, of the reception of the third signal UWB $S_{UWB3}$ from the reference tag $ET_{ref}$. For example, each third piece of information $S_{trans3}$ is transmitted to a piece of equipment of a data network NET. A propagation time piece of information of the third UWB signal $S_{UWB3}$ is then determined for each of the beacons. The propagation time piece of information can be determined from the timestamping piece of data produced after reception of the third UWB signal $S_{UWB3}$ by one of the beacons and from the first time piece of information $T_1$, for example by subtracting the time of transmission of the third UWB signal $S_{UWB3}$ from the time of reception of said third UWB signal $S_{UWB3}$. In this example, the propagation time piece of information then comprises the travel time of the third UWB signal $S_{UWB3}$ from its transmission by the reference tag $ET_{ref}$ until its reception by one of the beacons or by the mobile beacon $B_M$. This means that the entire location system can be coordinated and synchronized by sending a synchronization signal for each beacon.

In one embodiment, the mobile beacon $B_M$ and/or one of the beacons comprises calculation means configured to determine the propagation time piece of information from the timestamping piece of data and the first time piece of information $T_1$, said propagation time piece of information comprising the travel time of the third UWB signal $S_{UWB3}$ between the reference tag $ET_{ref}$ and the beacon comprising said calculation means. This advantageously enables the calculation of the propagation time of the third UWB signal $S_{UWB3}$ to be implemented directly within the beacons so as to be able to transmit the propagation time piece of information via the third piece of information $S_{trans3}$ subsequently transmitted. In one alternative, calculating the propagation time piece of information is subsequently implemented, after receiving the third piece of information $S_{trans3}$ by a piece of equipment of a data network NET.

In one embodiment, calculating the propagation time piece of information is implemented for each of the beacons. Calculating the propagation time piece of information can also be implemented for the mobile beacon $B_M$. Each propagation time piece of information includes the travel time of the third UWB signal $S_{UWB3}$ between the reference tag $ET_{ref}$ originating its transmission and each of the beacons. Each propagation time piece of information can then be compared, for example by means of a comparator, to determine the different travel times of the third UWB signal $S_{UWB3}$ between the reference tag $Et_{ref}$ originating its transmission and each of the beacons. Advantageously, this allows the clocks of the different beacons to be synchronized with each other to enable the use of the beacons in the implementation of subsequent calculations, for example, calculations of the position of an object by trilateration.

Trilateration with the Mobile Beacon

In one embodiment, calculating the position of at least one radio tag UWB $ET_1$ is implemented by trilateration, said trilateration being implemented by means of the mobile beacon $B_M$ and by means of at least two beacons. In this embodiment, the position of the mobile beacon $B_M$ has previously been precisely determined, for example by means of the location system $S_{GEO}$.

One advantage is to be able to use a mobile beacon in implementing position calculations by trilateration, when the precise position of the mobile beacon $B_M$ has been determined, for example by means of the location system $S_{GEO}$. Another advantage is to improve location precision of a pre-existing fixed detection infrastructure by adding a beacon with a specific position to the location infrastructure.

In one embodiment, at least one mobile beacon $B_M$ having known position is implemented in a method for calculating a position of at least one second mobile beacon $B_M$. Determining the position of the second mobile beacon $B_M$ advantageously enables said second mobile beacon $B_M$ to be used in the subsequent implementation of calculations of the position of an object by trilateration. Another advantage is to be able to track the movement of one or a plurality of mobile beacons over time by implementing position calculations at regular time intervals.

Data Exchange Between the Mobile Beacon and the Data Network

According to one embodiment, the mobile beacon $B_M$ comprises means for transmitting a first piece of information $S_{trans1}$. The first piece of information $S_{trans1}$ comprises the first tag piece of data $D_1$ and the first timestamping piece of data $H_1$ associated with said first tag piece of data $D_1$. The first piece of information $S_{trans1}$ is transmitted to a data server by non-wireless communication means. In one example, the non-wireless communication means include a Wi-Fi, 4G, 5G or even Bluetooth link. One advantage is to be able to store on a data server information related to an object or parcel to which the tag $ET_1$ originating transmission of the first tag piece of data $D_1$ is affixed.

In one embodiment, the first piece of information $S_{trans1}$ is sent continuously to a piece of equipment of a data network NET. This is made possible in particular when the mobile beacon $B_M$ is permanently connected to the data network NET via the non-wired connection means.

In one embodiment, the mobile beacon $B_M$ is configured to receive data from a piece of equipment of the data network NET. This scenario is advantageous when a user wishes to determine position of a radio tag $ET_1$ and wishes to access the information system managing all the positions of the tags from their mobile beacon. Thus, the mobile beacon $B_M$ can act as an access terminal to the data of the radio tags, for example by means of a user interface connected to said mobile beacon $B_M$. This is made possible when the mobile beacon $B_M$ is connected to a piece of equipment of the data network NET by the non-wired connection means.

According to one embodiment, the mobile beacon $B_M$ can store data received from the piece of equipment of the data network NET within its memory MEM. The data received may, for example, include recent data stored on the piece of equipment of the data network NET by another mobile or fixed beacon. One advantage is to establish a bidirectional link between the mobile beacon $B_M$ and the piece of equipment of the data network NET in order to be able to receive updated information on several elements of the system, for example position of other mobile beacons or information on UWB tags that have recently been energized.

UHF Mapping by the Mobile Beacon

In one embodiment, the method according to the invention comprises receiving a first amount of UHF energy $B_{UHF1}$ by the mobile beacon $B_M$. Receiving the first amount of UHF energy $E_{UHF1}$ is performed by means of a UHF receiver $REC_{UHF}$ of the mobile beacon $B_M$. The first amount of UHF energy $E_{UHF1}$ is then compared with a threshold energy value $E_{threshold}$. The threshold energy value $E_{threshold}$ is, for example, the energy value from which it is assumed that a zone of the environment is sufficiently supplied with UHF energy and does not require additional UHF energy supply to allow sufficient detection of the UWB radio tags present in this zone of the environment. In one example, the threshold energy value is a predetermined threshold energy value. The predetermined threshold energy value is, for example, configured by a user using the user interface connected to an electronic device comprising the mobile beacon $B_M$ or paired with said mobile beacon $B_M$. The comparison between the first amount of UHF energy $E_{UHF1}$ and the threshold energy value $E_{threshold}$ is, for example, carried out by means of a comparator and makes it possible to determine whether the first amount of UHF energy $E_{UHF1}$ is lower or higher than the threshold energy value $E_{threshold}$. Comparing the first amount of UHF energy $E_{UHF1}$ with the threshold energy value $E_{threshold}$ makes it possible in particular to determine whether a zone is sufficiently supplied with UHF energy by the infrastructure or whether, on the contrary, this zone requires an additional UHF power supply to allow the tags present in said zone to transmit UWB frames.

Figure 6:
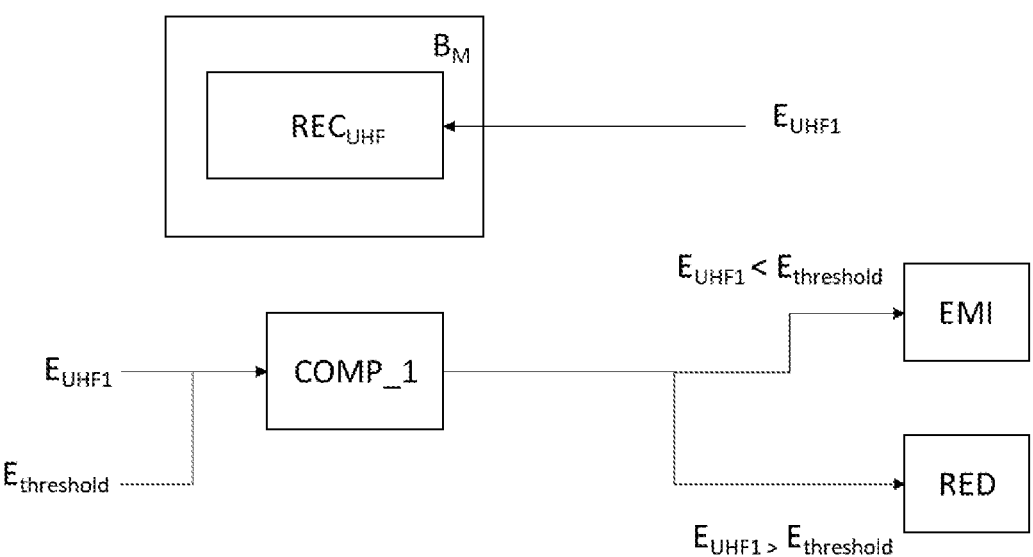
FIG. 6: A flowchart of the method according to the invention when it comprises comparing an amount of UHF energy with a threshold energy value.

In one embodiment, with reference to FIG. 6, the mobile beacon $B_M$ is configured to transmit the first UHF signal $S_{UHF1}$ if the first amount of UHF energy $E_{UHF1}$ is less than the threshold energy value $E_{threshold}$ and to reduce energy transmitted by the UHF transmitter $EM_{UHF}$ in the event that the first amount of UHF energy $E_{UHF1}$ received is greater than the threshold energy value $E_{threshold}$. This configuration advantageously makes it possible to "map" the UHF energy of several zones and, a posteriori, either to supply UHF energy to a weakly supplied zone, or on the contrary, to reduce transmission of UHF signals by the mobile beacon $B_M$ if the zone is already sufficiently supplied. In one example, transmission of the first UHF signal $S_{UHF1}$ advantageously results in the spontaneous transmission of UWB signals by tags present in an initially low-energized zone. Another advantage is to be able to detect change of state in the detection environment, for example a failure of a transmitter or a re-arrangement of elements in the environment resulting in an increase or decrease in the overall detected UHF energy. Another advantage is to be able to reduce overall power consumption of the system by reducing the UHF power transmitted by the different beacons in the zone if said zone is already sufficiently energized.

In one embodiment, the mobile beacon $B_M$ is configured to transmit a signal comprising a UHF coverage piece of information. The UHF coverage piece of information may comprise, for example, a piece of information on the amount of UHF energy received by the mobile beacon $B_M$. The signal comprising the UHF coverage piece of information may be, for example, the second UWB signal $S_{UWB2}$ if the UHF coverage piece of information is sent to equipment comprising a UWB receiver, such as a fixed beacon or another mobile beacon. The signal comprising the UHF coverage piece of information may also be of a different nature, if the UHF coverage piece of information is sent to another piece of equipment, such as a piece of equipment in a data network NET. One advantage is to be able to collect information on the amount of UHF energy present in a zone of the environment, in order to be able to a posteriori modulate the UHF energy transmitted by the different beacons near the zone in which the mobile beacon $B_M$ performs a UHF coverage diagnosis, according to the amount of UHF energy present in said zone.

Near Field Illumination

Figure 7:
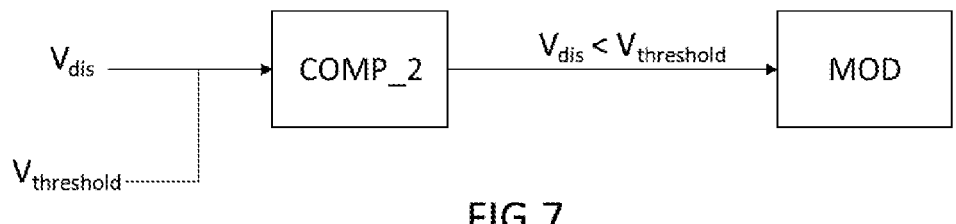
FIG. 7: A flowchart of the method according to the invention when it comprises comparing a distance value with a threshold distance value.

In one embodiment, with reference to FIG. 7, the method according to the invention comprises measuring a distance value $V_{dis}$ between an object and the mobile beacon $B_M$ by means of a distance sensor. The distance sensor may comprise, for example, an ultrasonic sensor, an inductive sensor, a magnetic sensor, an optical sensor or even a capacitive sensor. The distance sensor can be an infrared range finder, for example. However, the distance sensor used is not limited to the aforementioned examples and may comprise any type of sensor for evaluating a distance between said sensor and an object, or even a combination of different sensors for obtaining a more accurate value of the distance between the object and the mobile beacon $B_M$.

In one embodiment, the distance value $V_{dis}$ measured by means of the sensor is compared with a predetermined threshold distance value $V_{threshold}$. Comparison can be done using a comparator COMP.

In one example, transmission of the first energizing UHF signal $S_{UHF1}$ is then modulated according to the result of the comparison between the distance value $V_{dis}$ and the predetermined threshold distance value $V_{threshold}$. Modulating the first UHF signal $S_{UHF1}$ may, for example, comprise increasing power of said first UHF signal $S_{UHF1}$ delivered when the distance value $V_{dis}$ is greater than the predetermined threshold distance value $V_{threshold}$. This advantageously makes it possible to adapt the signal when the UHF transmitter $EM_{UHF}$ of the mobile beacon $B_M$ is at a position away from a UWB tag, to ensure detection of said UHF signal $S_{UHF1}$. Modulating the first UHF signal $S_{UHF1}$ may also comprise reducing power of said first UHF signal $S_{UHF1}$ when the distance value $V_{dis}$ is less than the predetermined threshold distance value. This advantageously makes it possible to reduce the overall energy consumption of the system by reducing power of the first UHF signal $S_{UHF1}$ transmitted when the UHF transmitter $EM_{UHF}$ of the mobile beacon $B_M$ is close to a UWB radio tag to be energized.

In one alternative, modulating the first UHF signal $S_{UHF1}$ comprises increasing power of said first UHF signal $S_{UHF1}$ when the distance value $V_{dis}$ from the UHF transmitter to the object is less than the distance value threshold $V_{threshold}$. This advantageously makes it possible to optimize UHF energy supply of a UWB radio tag when the UHF transmitter of the mobile beacon $B_M$ is close to said UWB radio tag to be energized. Another advantage is to confirm presence of a UWB radio tag on the object in proximity to the mobile beacon. Indeed, a UWB radio tag is configured to transmit at least one UWB signal in response to the power supply provided by a UHF signal.

In one alternative, modulating the first UHF signal $S_{UHF1}$ comprises reducing power of said first UHF signal $S_{UHF1}$ when the distance value $V_{dis}$ from the UHF transmitter to the object is greater than the distance value threshold $V_{threshold}$. This advantageously allows the energy of the UHF power source to be saved when the UWB radio tags are too distant to be properly energized.

In one embodiment, receiving a UWB signal by the UWB receiver $REC_{UWB}$ of the mobile beacon $B_M$ causes power of the first UHF signal $S_{UHF1}$ to increase in response to said receiving the UWB signal. This increase in power can, for example, be implemented by a user via a user interface. In this case, the user interface comprises a control unit for modulating the UHF signal transmitted by the UHF transmitter $EM_{UHF}$ of the mobile beacon and means for informing the user of the reception of a UWB signal by the mobile beacon $B_M$, for example, visual or audible alert means. One advantage is to ensure that the UWB signal received by the mobile beacon $B_M$ comes from a UWB radio tag located in proximity to the UHF source.

In one embodiment, the first UWB signal $S_{UWB1}$ received by the mobile beacon $B_M$ is associated with a duration time piece of information. The duration time piece of information comprises, for example, the duration during which the first UWB signal $S_{UWB1}$ transmitted by the first UWB tag $ET_1$ has been received by the mobile beacon $B_M$. The duration time piece of information may also comprise the first timestamping piece of data $H_1$ of the reception of said first signal UWB $S_{UWB1}$ by the mobile beacon $B_M$. The duration time piece of information can, for example, be stored in the memory MEM of the mobile beacon $B_M$. One advantage is to associate a reception duration with a UWB signal received by the mobile beacon $B_M$, for example to ensure that said received UWB signal actually comes from a UWB tag located in proximity to the mobile beacon.

According to one embodiment, the duration time piece of information associated with the first UWB signal $S_{UWB1}$ is sent to a piece of equipment of a data network NET by means of a non-wired link. The non-wired link may comprise WI-FI, 4G, 5G, or Bluetooth transmission means. This configuration is particularly advantageous when a same UWB signal is received by a plurality of mobile beacons. The duration time piece of information comprising the duration of reception of the first UWB signal makes it possible to determine which mobile beacon $B_M$ is located in proximity to the UWB radio tag originating transmission of said first UWB signal $S_{UWB1}$.

In one alternative, the duration time piece of information associated with the first UWB signal $S_{UWB1}$ may be transmitted to a UWB receiver of a fixed beacon or another mobile beacon within the second UWB signal $S_{UWB2}$ transmitted by the UWB transmitter $EM_{UWB}$ of the mobile beacon $B_M$.

According to one embodiment, the duration time piece of information is associated with the distance value $V_{dis}$ from the UHF transmitter to the object. In this example, the first tag UWB $ET_1$ is affixed to the object from which the distance value $V_{dis}$ is measured. The association can be made within the memory MEM of the mobile beacon or within a piece of equipment of a data network NET. This configuration is advantageous in the event that a same UWB signal is received by a plurality of mobile beacons. It is thereby possible to more precisely identify the mobile beacon $B_M$ located in proximity to the radio tag UWB originating transmission of the first UWB signal $S_{UWB1}$ sensed by a plurality of mobile beacons $B_M$. Another advantage is to reduce uncertainty on the position of the UWB radio tag originating transmission of the first UWB signal $S_{UWB1}$.

Background Information

In one embodiment, the first UWB signal $S_{UWB1}$ received by the mobile beacon $B_M$ is associated with a context piece of information. The context piece of information also includes information on the context in which the mobile beacon $B_M$ operates when it receives the UWB signals from an energized UWB tag. This context piece of information may notably comprise values associated with physical data related to the environment in which the mobile beacon $B_M$ operates, or values associated with physical data related to the mobile beacon $B_M$ itself. The context piece of information can, for example, comprise the distance value $V_{dis}$ to an obstacle or even the distance value of the mobile beacon $B_M$ to the ground, the first position piece of data $POS_1$, a movement piece of information of the mobile beacon $B_M$ or even the duration time piece of information. The duration time piece of information comprises, for example, the duration during which the first UWB signal $S_{UWB1}$ transmitted by the first UWB tag $ET_1$ has been received by the mobile beacon $B_M$. The duration time piece of information may also comprise the first timestamping piece of data $H_1$ of the reception of said first signal UWB $S_{UWB1}$ by the mobile beacon $B_M$. In another case, the duration time piece of information comprises the time during which the environment has been energized by the embedded UHF transmitter $EM_{UHF}$ by the mobile beacon $B_M$. According to another example, the context piece of information comprises a sound recording acquired by a sensor, or even an image or video sequence acquired by a camera positioned on the mobile beacon $B_M$.

In one embodiment, the context piece of information comprises information on the directionality of the UHF signal $S_{UHF1}$ transmitted by the UHF transmitter $EM_{UHF}$ of the mobile beacon $B_M$. According to one example, the piece of information comprises a privileged UHF direction piece of information for the UHF signal $S_{UHF1}$.

In one embodiment, the context piece of information comprises information on the duration between switching on and switching off transmission of the first energizing signal $S_{UHF1}$. According to one case, the context piece of information also includes information on antennas of the mobile beacon $B_M$ involved in the transmission of the energizing signal $S_{UHF1}$ and information on the orientation of said antennas in space.

In one embodiment, the duration piece of information comprises a piece of information on the duration of energization of a UWB tag by the first energizing signal $S_{UHF1}$ coupled to a piece of information on the power transmitted by the source $S_{UHF1}$.

According to one example, the context piece of information comprises a piece of information on the presence of other mobile beacon BMS in the detection environment. According to another example, the context piece of information comprises values measured by different sensors installed on the mobile beacon $B_M$ such as position sensors, motion sensors, temperature sensors or even pressure sensors. The context piece of information may be processed by processing means to determine an identification piece of data of at least one mobile beacon having transmitted a first UHF energizing signal $S_{UHF1}$ originating the transmission of a first UWB signal $S_{UWB1}$ by a first UWB radio tag $ET_1$ and received by the mobile beacon $B_M$. One advantage is to be able to precisely identify a mobile beacon originating the transmission of an energizing UHF signal having energized a UWB radio tag, according to different physical parameters.

Mobile Beacon

According to another aspect, the invention relates to a mobile beacon $B_M$ configured to implement the method of the invention according to any one of the previously described embodiments.

In one embodiment, the mobile beacon $B_M$ comprises means for storing an amount of electric energy. The means of storing an amount of electric energy in particular enable the UHF transmitter $EM_{UHF}$ of the mobile beacon, or the various sensors installed on the mobile beacon $B_M$ to be supplied with electric energy. The means of storing an amount of electric energy may, for example, comprise a battery. The battery can, for example, be charged at the mains. The means of storing electric energy may comprise any battery technology among lithium-ion, Ni-Cad, Ni-Mh or Pb/Sla technologies. However, this embodiment of the invention is not limited to the aforementioned battery technologies. In one embodiment, the mobile beacon may comprise an association of a plurality of battery technologies or even several batteries of similar technologies.

In one embodiment, the mobile beacon $B_M$ comprises a photovoltaic source of electric energy supply. The photovoltaic source of electric energy supply comprises, for example, a solar panel or a plurality of solar panels.

The mobile beacon $B_M$ may comprise an indicator of the charge level of the means for storing electric energy. The indicator may be a visual indicator such as a light indicator. According to one alternative, the indicator may be an audible indicator such as an alarm. The mobile beacon $B_M$ may also comprise a combination of visual and/or audible indicators. The indicator can be configured to activate when the charge level of the electric energy storage means falls below a predetermined charge threshold. This configuration is particularly advantageous in the event that the electric energy storage means require a mains supply, to warn a user of the need to recharge said electric energy storage means. Another advantage is to be able to warn a user of a risk of malfunction of the mobile beacon $B_M$ in the event of excessive discharge of said electric energy storage means.

In one embodiment, the mobile beacon $B_M$ comprises embedded sensors. Embedded sensors can include pressure sensors, distance sensors, shock sensors, vibration sensors or temperature sensors. In general, the mobile beacon $B_M$ may comprise any type of sensor for obtaining information on physical parameters of the environment in which said mobile beacon $B_M$ operates, or even any type of sensor for measuring values of physical parameters derived from the interaction between said mobile beacon $B_M$ and its environment. In one example, the different sensors are supplied by a battery of the mobile beacon $B_M$.

According to one embodiment in which the mobile beacon $B_M$ comprises a plurality of sensors, the data measured by the different sensors are stored within the memory MEM of the mobile beacon $B_M$. According to one exemplary embodiment, the measured data are timestamped and stored in the memory MEM of the mobile beacon $B_M$ are then sent to a piece of equipment of a data network NET. This is particularly advantageous for collecting information about the environment in which the mobile beacon $B_M$ operates and about possible interactions between said mobile beacon $B_M$ and its enviornment.

In one embodiment, the mobile beacon $B_M$ comprises control means. The control means are configured to control transmission of the first UHF signal $S_{UHF1}$ transmitted by the UHF transmitter $EM_{UHF}$ of the mobile beacon $B_M$. The control means can be controlled by a user. Control by a user is, for example, implemented by means of a user interface of an electronic device comprising the mobile beacon $B_M$ or paired with said mobile beacon $B_M$. The control means can make it possible to modulate the first UHF signal $S_{UHF1}$ delivered by at least one transmission antenna of the mobile beacon $B_M$. The control means may also allow shutdown of at least one transmission antenna of the mobile beacon $B_M$. The control means may be autonomous. By "autonomous", it is meant that the control means can be configured upstream by a user to automatically control modulation of a UHF signal transmitted by a transmission antenna or to control shutdown of a transmission antenna. This automatic control of transmission antennas may depend on the reception and processing of a piece of information from a sensor such as a motion sensor, a position sensor or any other sensor embedded by the mobile beacon $B_M$.

According to one embodiment, the mobile beacon may comprise one or a plurality of detection indicators. Detection indicators may be visual and/or audible indicators. According to one example, the detection indicators allow a user to be informed of the detection of a UWB signal by the mobile beacon $B_M$. Detection indicators can be, for example, indicator lights or alarms. The indicators may also be integrated into a user interface including, for example, a screen and sound transmission means. In this case, the visual indicators may comprise a detection message appearing on the user interface screen and the audible indicators the issuance of an alert sound by the sound transmission means. One advantage is to warn a user of the presence of a UWB transmitter such as a radio tag in the zone where the mobile beacon $B_M$ is located. According to another example, receiving a UHF signal by a UHF receiver of the mobile beacon $B_M$ causes the visual and/or audible indicators to be activated. An advantage is to warn a user of the presence of another UHF source in the zone in which the mobile beacon $B_M$ is located.

In one embodiment, the mobile beacon $B_M$ is configured to exchange data with at least one other mobile beacon. Data can be exchanged by transmitting a second UWB signal $S_{UWB2}$ by the mobile beacon $B_M$ and receiving said second UWB signal $S_{UWB2}$ by another mobile beacon. The second $UWB_2$ signal may comprise some or all of the data stored in the internal memory of the mobile beacon $B_M$. One advantage is to allow data exchange between multiple mobile beacons when network coverage does not allow connection to a piece of equipment on the data network NET, for example when there is no WI-FI, 3G, 4G or 5G coverage.

According to one embodiment, the mobile beacon $B_M$ comprises a memory. The memory allows the mobile beacon $B_M$ to store decoded information of received signals, such as identification data of a piece of equipment having transmitted a signal received by the mobile beacon $B_M$, for example the first piece of data $D_1$, position data, for example the first position piece of data $POS_1$, timestamping data (such as timestamping of transmission and reception of UWB signals), data measured by sensors embedded by the mobile beacon $B_M$, or even the context piece of information.

The information is, for example, stored in the memory of the mobile beacon $B_M$ as long as it is not connected to a data network, and is, for example, transmitted to a remote equipment by means of a wireless link as soon as the connection is reestablished. This transmitted information can be subsequently operated on a remote equipment or on a data server that has received the information transmitted by the mobile beacon $B_M$, for example by implementing calculations by means of a calculator to reconstruct a position or a path of the mobile beacon $B_M$ over a given time interval.

Mobile Cart Embedding a Mobile Beacon

Figure 8:
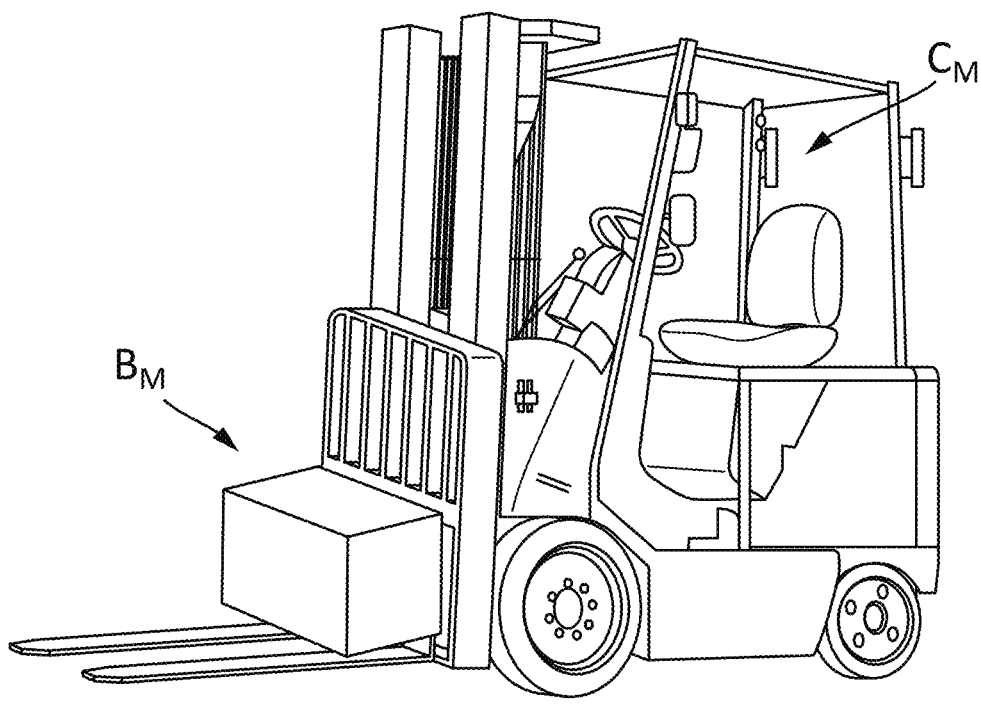
FIG. 8: A schematic diagram of a mobile cart comprising a mobile beacon.

According to another aspect, with reference to FIG. 8, the invention relates to a mobile cart $C_M$ embedding the mobile beacon $B_M$ according to the invention and more generally any rolling object capable of moving and including a mobile beacon.

The mobile beacon $B_M$ can be made integral with the mobile cart $C_M$ by mechanical connection means. The mechanical connection means may comprise attachment elements such as screws, nuts, bolts where any other attachment element likely to make the mobile beacon $B_M$ integral with said mobile cart $C_M$. In one alternative, the mobile cart comprises at least one rail and the mobile beacon comprises means of cooperation with said at least one rail, the mechanical cooperation of said at least one rail of the mobile cart $C_M$ with the means of cooperation of the mobile beacon $B_M$ resulting in a mechanical assembly securing the mobile beacon $B_M$ to said mobile cart $C_M$. However, the elements included in the mechanical connection means are not limited to the aforementioned examples, and any mechanical element for securing the mobile beacon $B_M$ to the mobile cart $C_M$ may be included in the mechanical connection means. Advantageously, the risks of deteriorating the mobile beacon $B_M$ when moving the mobile cart $C_M$ are thus reduced.

In one embodiment, the mobile cart $C_M$ embedding the mobile beacon $B_M$ is a lifting and handling apparatus, such as a forklift. According to another example, the mobile cart $C_M$ is a hand-operated pallet truck. In this example, the lifting and handling device includes a lifting system. The lifting system may comprise a plurality of elements such as a pulley, mast, hydraulic system, and forks. The lifting and handling apparatus may comprise an engine or motor compartment containing a motor such as an electric motor or an engine such as a heat engine. The lifting and handling apparatus may comprise a cabin intended for receiving a user of said lifting and handling apparatus. The cabin may include a steering wheel, seat, and means for controlling the lifting system. In this exemplary embodiment, the mobile beacon $B_M$ made integral with the lifting and handling apparatus advantageously enables UWB tags affixed to objects such as parcels moved by said lifting and handling apparatus to be energized.

The mobile beacon $B_M$ can be made integral with the lifting system of the mobile cart $C_M$ by the mechanical connection means. This advantageously allows moving the mobile beacon $B_M$ by moving the lifting system. This configuration is particularly advantageous when the mobile beacon $B_M$ comprises a UHF transmitter and a UWB tag is affixed to a parcel located at height. The movement of the lifting system then allows the UHF source to be brought closer to the UWB tag to be supplied, to cause transmission of a UWB signal by said UWB tag. This configuration is particularly advantageous in the case of loading an object at height onto the moving part of the forklift. Indeed, the fact that the mobile beacon $B_M$ is made integral with the mobile part of the cart allows detecting the object that the user is loading and therefore it is not necessary to wait until the mobile part has returned to its initial position to detect the loaded object.

According to one embodiment, the mobile beacon $B_M$ and/or the mobile cart comprises a distance sensor. The distance sensor is configured to calculate a distance between the ground and the moving part of said mobile cart $C_M$. The distance sensor can be either an ultrasonic sensor or a laser range finder. However, the type of sensor used is not limited to the above examples and can include any type of distance sensor or a combination of several distance sensors. One advantage is to determine how far from the ground the mobile part of the forklift is when loading or unloading an object containing a UWB tag.

In one embodiment, the mobile cart $C_M$ comprises a battery. The battery can be a battery for supplying both the mobile cart $C_M$ and the mobile beacon $B_M$ with electric energy. According to one alternative, the battery is only used to supply the mobile cart with electric energy. The mobile cart may also comprise audible and/or visual indicators. The audible and/or visual indicators are intended to warn a user of exceeding a predetermined charge level of said battery. This is particularly advantageous to warn a user of the need to recharge said battery to avoid system malfunction.

In one embodiment in which the battery supplies both the mobile cart $C_M$ and the mobile beacon $B_M$, exceeding the predetermined charge level of the battery causes the power supply of the mobile beacon $B_M$ to be interrupted by said battery. This advantageously makes it possible to save the remaining electric energy in the battery, for example to allow a user to use the remaining energy to approach a charging point such as a mains socket.

In one embodiment, the mobile cart $C_M$ embedding the mobile beacon $B_M$ may comprise a charging cradle. The charging cradle may comprise at least one electrical connector. The at least one electrical connector is configured to electrically connect to the battery of the mobile beacon $B_M$. Electrical connection between the charging cradle and the mobile beacon can be made, for example, via a plug and a socket. According to one embodiment, the charging cradle may advantageously be positioned at the lower part of the mobile cart $C_M$, at the lifting system. In this example, the connector of the cradle is configured to connect to the battery of the mobile beacon $B_M$ via the at least one electrical connector when the mobile cart lifting system is in the lowered position and the mobile beacon is made integral with said lifting system of the mobile cart $C_M$. One advantage is that the battery of the mobile beacon $B_M$ can be recharged when the lifting system of the mobile cart is not operated for loading or unloading an object. Another advantage is that there is no need for electrical cables connected to the battery of the mobile beacon $B_M$. In one alternative, the charging cradle includes an induction charger. The induction charger comprises, for example, a planar surface comprising a copper coil. However, any type of technology enabling the mobile beacon $B_M$ to be charged by induction is likely to be implemented within the scope of the invention. According to one example, the mobile beacon $B_M$ comprises a receiver compatible with the induction charger.

According to one embodiment, the mobile beacon $B_M$ and/or the mobile cart $C_M$ comprises light emitting means. The light emitting means may, for example, comprise a lamp, a headlight or any other electrically powered element configured to emit a light signal. The light emitting means can, for example, be powered by the battery of the mobile cart $C_M$ or the mobile beacon $B_M$. One advantage is to be able to light the environment when moving the mobile cart $C_M$ embedding the mobile beacon $B_M$ or when loading an object by said mobile cart $C_M$.

In one embodiment, the mobile beacon $B_M$ and/or the mobile cart $C_M$ comprise video recording means. The video recording means may, for example, comprise a camera. The video recording means can for example be powered by the battery of the mobile beacon $B_M$ or the mobile cart $C_M$. One advantage is to be able to associate an image or video sequence with timestamping of the reception of a UWB signal by the mobile beacon $B_M$. The images and/or video sequences acquired may, for example, be stored in the memory MEM of the mobile beacon $B_M$. This advantageously makes it possible to improve identification of the tags originating the transmission of the UWB signals received by the mobile beacon $B_M$, by obtaining a picture of said tags.

According to one embodiment, the mobile cart comprises a screen. For example, the screen is located in a user's cabin. In one embodiment, the screen is connected to the video recording means. One advantage is to allow a user to live track acquisition of video sequences by the video recording means. Another advantage is to be able to detect live a possible failure of said video recording means or even an anomaly when loading an object on the mobile cart $C_M$. In one embodiment, the mobile cart $C_M$ embedding the mobile beacon $B_M$ comprises a user interface. The user interface comprises, for example, a digital tablet comprising an internal memory. In one embodiment, the digital tablet comprises non-wired connection means for connecting to a piece of equipment of the data network. The non-wired connection means comprise, for example, a WI-FI, 3G, 4G, 5G or Bluetooth link. The digital tablet is connected to the mobile beacon via a wired or non-wired link. One advantage is to allow the mobile beacon to transmit part of the information contained in its memory MEM to the tablet. Another advantage is to allow a user to view the information contained in the memory of the mobile beacon $B_M$ directly on the digital tablet. Data contained in the internal memory of the digital tablet can be sent to a piece of equipment of the data network NET via non-wired connection means. In one embodiment, the link between the user interface and the piece of equipment of the data network NET is bidirectional. One advantage is to be able to retrieve information recently stored on the piece of equipment of the data network NET by at least one other connected piece of equipment, for example another mobile beacon $B_M$.

According to one embodiment, the screen of the mobile cart $C_M$ is configured to display contextual information. These are, for example, data measured by sensors, such as temperature data, data of the distance separating the mobile beacon $B_M$ or the mobile cart $C_M$ from an object in the environment. The contextual information displayed by the screen may also comprise information identifying a user. For example, the screen may comprise an interface through which a user identifies by means of a password. This information can then be stored in memory and possibly transmitted to third-party piece of equipment or a data network via a wireless link. Contextual information can also include a piece of data relating to the time the mobile cart $C_M$ is occupied by a user, or a piece of information on the equipment state (sensor failure detected, battery charge rate).

The contextual information may also comprise the contextual piece of information associated with the first signal $S_{UWB1}$. Contextual information may also comprise information identifying an object transported by the mobile cart $B_M$, or identifying a recipient of the object transported on the mobile cart $B_M$. For example, this includes information on the nature of an object transported within a box on which a radio tag UWB is affixed, or an identification piece of information of a customer for whom the object transported by the mobile cart $C_M$ is intended. In one example, the user interface displays several contextual pieces of information on the screen and displays an interface through which the user can confirm whether or not the information displayed is compliant. Contextual information and compliance validation can then be transmitted via a wireless link and by means of a communication interface, via a signal encoding these data. All this information can also be stored within a memory for transmission subsequently, or even for reading by another user.

According to one embodiment, the mobile beacon is associated with several pieces of equipment comprising screens. It is for example a fixed piece of equipment in the mobile cart, and a mobile piece of equipment such as a mobile tablet or smartwatch. For example, both screens are configured to display contextual information. Thus, advantageously, if the screen in the cabin displays a piece of information that requires verification, such as a loading problem, the user can exit the mobile cart and check whether the information are compliant or not by having access to display of the contextual information when they are outside the mobile cart. A piece of equipment comprising a display and associated with the mobile beacon may also be configured to transmit radio messages, such as UWB signals, for example to allow locating a user, or to allow correlation of the position of the user with that of the mobile beacon $B_M$ or the mobile cart $C_M$. According to one example, a piece of equipment comprising a screen is configured to implement communication and/or location means, for example via wifi, Bluetooth, 4G or GNSS, to detect and associate with a mobile beacon $B_M$ or a mobile cart $C_M$ present in the proximity thereof. According to another example, a piece of equipment comprising a screen and associated with the mobile beacon $B_M$ or the mobile cart $C_M$ is configured to issue an alert when it detects a connection error with the mobile beacon $B_M$ or with the mobile cart $C_M$. For example, this may be a case where the piece of equipment is paired with another mobile beacon $B_M$ or another mobile cart $C_M$ than the one it was configured to associate with. The alert can include an audible alert, an error message display, or even vibration.

According to one embodiment, the mobile beacon $B_M$ and/or the mobile cart $C_M$ is configured to associate with one or more pieces of equipment comprising a screen comprising the user interface.

According to one embodiment, the mobile beacon $B_M$ and/or the mobile cart $C_M$ is configured to associate with a piece of equipment comprising a screen and comprising sensors. The sensors include, for example, motion sensors, a compass or even a camera. The piece of equipment including a screen may also comprise an integrated location system. In this case, the contextual information includes, for example, both data received from sensors positioned on the mobile beacon $B_M$ and/or on the mobile cart $C_M$ and data received from sensors positioned on the piece of equipment comprising a screen and comprising sensors.

In one embodiment, the mobile beacon $B_M$ embedded by the mobile cart $C_M$ comprises shock detection means. The shock detection means may for example comprise a shock sensor or a vibration sensor. The shock detection means are configured to detect vibration or shock when moving the mobile cart $C_M$ or the mobile part of said mobile cart $C_M$. In one embodiment, detection of a vibration or a shock causes a detection signal to be transmitted from the shock detection means to the memory MEM of the mobile beacon. The detection signal includes a piece of information about a shock or vibration detected by the shock detection means. Transmission of the detection signal can be "automated". By "automated", it is meant that transmission of the detection signal can be carried out automatically to the memory of the mobile beacon $B_M$, for example when a certain shock or vibration threshold is reached.

In one embodiment, the detection signal is associated with the first tag piece of data $ET_1$. One advantage is to detect whether an object on which a UWB tag is affixed has received a shock upon loading, unloading or transporting said object. In one alternative, detection of a shock or vibration by the shock detection means results in the activation of a visual and/or audible indicator. For example, the indicator can be triggered when the shock or vibration measured exceeds a predetermined threshold value. In one example, the predetermined threshold value is set by a user via the user interface. One advantage is to produce a piece of information and transmit it directly to a user if the mobile cart $C_M$ and/or the mobile beacon $B_M$ embedded has been potentially damaged by the shock or vibrations. The user may also advantageously be informed of a risk of loss of calibration of the mobile beacon $B_M$ as a result of the shock experienced.

Mobile Beacon Embedded by a User

Figure 9:
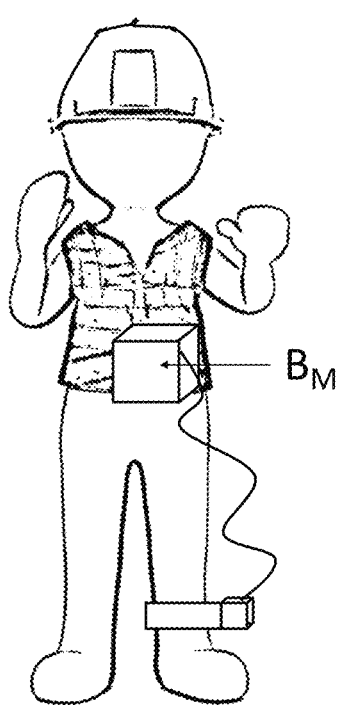
FIG. 9: An illustration of the mobile beacon when embedded by a user.

According to another aspect illustrated in FIG. 9, the invention relates to an element embedded by a user including a mobile beacon $B_M$ according to the invention. By "element embedded by a user", it is meant that the position of the "embedded" element follows the position of the user embedding said element when said user moves. Thus, according to various examples, the embedded element comprises a strapped element such as a harness, an element comprising shoulder straps such as a backpack, an element including a handle such as a suitcase, a handheld scanner, or even an element strapped onto a body limb of a user such as their arm. More generally, any type of element that can be embedded, moved or transported by a user is likely to be implemented within the scope of the invention. In one alternative, the mobile beacon $B_M$ is embedded by a user in a garment such as a vest comprising compartments for accommodating said mobile beacon $B_M$.

According to one embodiment, the mobile beacon $B_M$ is embedded by a user by means for attaching said mobile beacon $B_M$ to the user's body or garment. The attachment means may, for example, comprise a hook-and-loop fastener, or any other element allowing said mobile beacon $B_M$ to be secured to a user's body part or garment.

In one embodiment, the embedded element comprises at least one sensor. According to various examples, the sensor comprises a pressure sensor or even a motion sensor. More generally, any type of sensor enabling a physical parameter to be measured in connection with the user, with the environment in which the user operates or even in connection with interactions of said user with their environment is likely to be implemented within the scope of the invention. One advantage is to be able to determine a physical piece of information to define the context, for example an odometric type piece of information to deduce that the mobile beacon $B_M$ is in motion therefrom.

In one embodiment, the embedded element comprises at least one reading device. In one case, the reading device is configured to decode at least one piece of information from another device. According to one example, the reading device is configured to scan a piece of information stored in a quick response code, or even "QR code". According to another example, the reading device comprises a radio frequency identification, or "RFID" reader.

According to one embodiment, the reading device is offset to a part of a user's body. According to one example, the reading device is offset to a user's lower limbs. Depending on different cases, the reading device comprises wired or non-wired connection means. One advantage is that be able to read information previously stored in the environment. Another advantage is to be able to locate a mobile beacon $B_M$ more precisely.

According to another aspect, the invention relates to a system comprising a mobile beacon and at least one UWB radio tag.

According to one embodiment, the system comprises a plurality of UWB tags, the mobile beacon $B_M$ according to the invention, and the location system $L_{GEO}$. The elements of the system may interact with each other to implement any of the embodiments of the method according to the invention.

In one embodiment, the system also comprises a mobile cart $C_M$ embedding the mobile beacon $B_M$ or any rolling object likely to move and including a mobile beacon. According to another example, the system comprises an element embedded by a user and the mobile beacon $B_M$ according to the invention.

In all cases, the mobile beacon $B_M$ included in the system is configured to implement any of the embodiments of the method according to the invention.

The invention claimed is:

1. A method for transmitting a piece of information from at least one first Ultra-Wide Band (UWB) radio tag by means of a mobile beacon including transmission and reception means, the method comprising:

transmitting a first energizing signal by a transmitter of the mobile beacon;

receiving, by the mobile beacon, by means of a UWB receiver, a first UWB signal transmitted by the first UWB radio tag energized by said first energizing signal, said first UWB signal comprising a first tag piece of data;

time stamping said reception of the first UWB signal to produce a first timestamping piece of data associated with the first piece of data;

decoding the first tag piece of data and recording the first tag piece of data decoded in a memory of the mobile beacon;

associating a first position piece of data of the mobile beacon with said first tag piece of data, said position piece of data enabling the mobile beacon to be located, said first position piece of data being determined by means of a location system, and transmitting a first piece of information by the mobile beacon comprising said first tag piece of data and the first timestamping piece of data and transmitting a second piece of information by the mobile beacon including the first position piece of data to at least one piece of equipment of a data network, the first piece of information being transmitted to a data server via a Wifi, 4G, 5G or Bluetooth link and the second piece of information being transmitted in the form of a UWB message to a location system comprising at least one fixed beacon comprising means for receiving UWB signals to calculate by trilateration a position of the mobile beacon, said association between the first position piece of data of the mobile beacon and said first tag piece of data being performed by the data server so as to allow locating said mobile beacon.

2. The method according to claim 1, comprising:

transmitting a plurality of second UWB signals by the mobile beacon by means of a UWB transmitter, each second UWB signal comprising at least one encoded piece of data of identifying said mobile beacon;

receiving the plurality of second UWB signals by the location system comprising a plurality of UWB radio beacons, said location system comprising radio reception means and means for decoding the identification piece of data and for timestamping arrival of the second UWB signal;

transmitting to the mobile beacon by the location system, a piece of information of detecting the second UWB signal, and calculating, by means of the plurality of second signals received by each of the radio beacons, the first position piece of data of the mobile beacon.

3. The method according to claim 1, comprising:

transmitting a second UWB signal by the mobile beacon by means of a UWB transmitter, said second UWB signal comprising at least one encoded piece of data of identifying said mobile beacon, said transmitting causing activation of a clock to measure a first time interval, and transmitting a plurality of second UWB signals at an increased frequency for a second time interval in case of non-reception of a detection piece of information at the end of a first time interval, said detection piece of information indicating detection of the second UWB signal by a UWB reception system.

4. The method according to claim 1, wherein the mobile beacon receives the first position piece of data transmitted by:

a reference tag having known position;

a satellite geolocation system;

a geolocation system by geocoder;

a Wi-Fi geolocation system;

a geolocation system by use of a telecommunications operator, an RFID geolocation system.

5. The method according to claim 1, wherein the first piece of information and the second piece of information are transmitted to a data server by a wireless communication interface, and wherein the association between the first position piece of data and the first tag piece of data is made within the mobile beacon, said first position piece of data being transmitted to the mobile beacon by the location system.

6. The method according to claim 1, comprising:

receiving, by the mobile beacon and by means of a UWB receiver, a third UWB signal transmitted by at least one reference UWB radio tag having known position, said third UWB signal comprising a first time piece of information encoded of timestamping transmission of said third UWB signal and comprising a second encoded piece of data of identifying the reference UWB radio tag using a UWB receiver;

timestamping said reception of the third UWB signal to produce a second time stamping piece of data of the reception of the time piece of information and the second piece of data;

recording the first decoded time piece of information and the second decoded identification piece of data in a memory of the mobile beacon, and transmitting, by the mobile beacon, a third piece of information comprising the first time piece of information, the second piece of data and the second time-stamping data to at least one piece of equipment of the data network.

7. The method according to claim 6, comprising:

transmitting, by the mobile beacon and by a plurality of UWB radio beacons, a plurality of third pieces of information by means of a communication interface and to at least one piece of equipment of the data network;

calculating, for the mobile beacon and for each UWB radio beacon and by means of a calculator, a time piece of information of propagating every third UWB signal, each propagation time piece of information being calculated from each first time piece of information and each second timestamping piece of data;

comparing, by a comparator, the time information of propagating every third UWB signal, and synchronizing a clock of the mobile beacon and a clock of each UWB radio beacon with each other according to the result of the comparisons of the propagation time information.

8. The method according to claim 1, comprising implementing, by means of a calculator, at least one calculation by trilateration of a relative position of the first UWB radio tag, from the first UWB signal transmitted by said first UWB radio tag and received by the mobile beacon and by at least two other UWB radio beacons.

9. The method according to claim 1, comprising:

receiving a first amount of Ultra-High Frequency (UHF) energy by the mobile beacon by means of a UHF receiver;

comparing the first amount of UHF energy received with a predetermined threshold energy value by means of a comparator;

transmitting the first energizing signal by means of the transmitter of the mobile beacon if the first amount of UHF energy received is less than the predetermined threshold energy value;

reducing the energy transmitted by the transmitter of the mobile beacon if the first amount of UHF energy received is greater than the predetermined threshold energy value.

10. The method according to claim 1, comprising:

measuring a distance value between an object and the mobile beacon by means of a distance sensor;

comparing, by means of a comparator, the distance value measured with a predetermined threshold distance value ($V_{threshold}$);

modulating the transmission of the first energizing signal by a UHF transmitter of the mobile beacon if the distance value measured is less than the predetermined threshold distance value.

11. The method according to claim 1, wherein the first UWB signal received by the mobile beacon is associated with a context piece of information corresponding to a piece of information on the environment in which the mobile beacon operates, and wherein the first piece of information transmitted to the equipment of a data network comprises the context piece of information, the context piece of information being processed by processing means to determine an identification piece of data of the mobile beacon having transmitted the first energizing signal originating transmission by the first UWB radio tag of said first UWB signal received by said mobile beacon.

12. A mobile beacon comprising means for transmitting an energizing signal, means for receiving UWB signals, a calculator and a memory, wherein the mobile beacon is configured to implement the method of claim 1.

13. The mobile beacon according to claim 12, comprising at least two transmission antennas, each transmission antenna being configured to transmit at least one portion of the first energizing signal.

14. A mobile cart comprising the mobile beacon according to claim 12.

15. An element embedded by a user including the mobile beacon according to claim 12.

16. A system comprising the mobile beacon according to claim 12 and comprising at least one first UWB radio tag configured to transmit the first UWB signal.

17. A method for transmitting a piece of information from at least one first Ultra-Wide Band (UWB) radio tag by means of a mobile beacon including transmission and reception means, the method comprising:

transmitting a first energizing signal by a transmitter of the mobile beacon;

receiving, by the mobile beacon, by means of a UWB receiver, a first UWB signal transmitted by the first UWB radio tag energized by said first energizing signal, said first UWB signal comprising a first tag piece of data;

time stamping said reception of the first UWB signal to produce a first timestamping piece of data associated with the first piece of data;

decoding the first tag piece of data and recording the first tag piece of data decoded in a memory of the mobile beacon;

associating a first position piece of data of the mobile beacon with said first tag piece of data, said position piece of data enabling the mobile beacon to be located, said first position piece of data being determined by means of a location system, and transmitting a first piece of information by the mobile beacon comprising said first tag piece of data and the first timestamping piece of data and transmitting a second piece of information by the mobile beacon including the first position piece of data to at least one piece of equipment of a data network, receiving, by the mobile beacon and by means of a UWB receiver, a third UWB signal transmitted by at least one reference UWB radio tag having known position, said third UWB signal comprising a first time piece of information encoded of timestamping transmission of said third UWB signal and comprising a second encoded piece of data of identifying the reference UWB radio tag using a UWB receiver;

timestamping said reception of the third UWB signal to produce a second time stamping piece of data of the reception of the time piece of information and the second piece of data;

recording the first decoded time piece of information and the second decoded identification piece of data in a memory of the mobile beacon, and transmitting, by the mobile beacon, a third piece of information comprising the first time piece of information, the second piece of data and the second timestamping data to at least one piece of equipment of the data network.

18. A method for transmitting a piece of information from at least one first Ultra-Wide Band (UWB) radio tag by means of a mobile beacon including transmission and reception means, the method comprising:

transmitting a first energizing signal by a transmitter of the mobile beacon;

receiving, by the mobile beacon, by means of a UWB receiver, a first UWB signal transmitted by the first UWB radio tag energized by said first energizing signal, said first UWB signal comprising a first tag piece of data;

time stamping said reception of the first UWB signal to produce a first timestamping piece of data associated with the first piece of data;

decoding the first tag piece of data and recording the first tag piece of data decoded in a memory of the mobile beacon;

associating a first position piece of data of the mobile beacon with said first tag piece of data, said position piece of data enabling the mobile beacon to be located, said first position piece of data being determined by means of a location system, and transmitting a first piece of information by the mobile beacon comprising said first tag piece of data and the first timestamping piece of data and transmitting a second piece of information by the mobile beacon including the first position piece of data to at least one piece of equipment of a data network, receiving a first amount of Ultra-High Frequency (UHF) energy by the mobile beacon by means of a UHF receiver;

comparing the first amount of UHF energy received with a predetermined threshold energy value by means of a comparator;

transmitting the first energizing signal by means of the transmitter of the mobile beacon if the first amount of UHF energy received is less than the predetermined threshold energy value;

reducing the energy transmitted by the transmitter of the mobile beacon if the first amount of UHF energy received is greater than the predetermined threshold energy value.

19. A method for transmitting a piece of information from at least one first Ultra-Wide Band (UWB) radio tag by means of a mobile beacon including transmission and reception means, the method comprising:

transmitting a first energizing signal by a transmitter of the mobile beacon;

receiving, by the mobile beacon, by means of a UWB receiver, a first UWB signal transmitted by the first UWB radio tag energized by said first energizing signal, said first UWB signal comprising a first tag piece of data;

time stamping said reception of the first UWB signal to produce a first timestamping piece of data associated with the first piece of data;

associating a first position piece of data of the mobile beacon with said first tag piece of data, said position piece of data enabling the mobile beacon to be located, said first position piece of data being determined by means of a location system, and transmitting a first piece of information by the mobile beacon comprising said first tag piece of data and the first timestamping piece of data and transmitting a second piece of information by the mobile beacon including the first position piece of data to at least one piece of equipment of a data network, measuring a distance value between an object and the mobile beacon by means of a distance sensor;

comparing, by means of a comparator, the distance value measured with a predetermined threshold distance value ($V_{threshold}$);

modulating the transmission of the first energizing signal by a UHF transmitter of the mobile beacon if the distance value measured is less than the predetermined threshold distance value.

20. A method for transmitting a piece of information from at least one first Ultra-Wide Band (UWB) radio tag by means of a mobile beacon including transmission and reception means, the method comprising:

transmitting a first energizing signal by a transmitter of the mobile beacon;

receiving, by the mobile beacon, by means of a UWB receiver, a first UWB signal transmitted by the first UWB radio tag energized by said first energizing signal, said first UWB signal comprising a first tag piece of data;

time stamping said reception of the first UWB signal to produce a first timestamping piece of data associated with the first piece of data;

decoding the first tag piece of data and recording the first tag piece of data decoded in a memory of the mobile beacon;

associating a first position piece of data of the mobile beacon with said first tag piece of data, said position piece of data enabling the mobile beacon to be located, said first position piece of data being determined by means of a location system, and transmitting a first piece of information by the mobile beacon comprising said first tag piece of data and the first timestamping piece of data and transmitting a second piece of information by the mobile beacon including the first position piece of data to at least one piece of equipment of a data network, wherein the first UWB signal received by the mobile beacon is associated with a context piece of information corresponding to a piece of information on the environment in which the mobile beacon operates, and wherein the first piece of information transmitted to the equipment of a data network comprises the context piece of information, the context piece of information being processed by processing means to determine an identification piece of data of the mobile beacon having transmitted the first energizing signal originating transmission by the first UWB radio tag of said first UWB signal received by said mobile beacon.

21. A mobile beacon comprising means for transmitting an energizing signal, means for receiving UWB signals, a calculator and a memory, wherein the mobile beacon is configured to implement a method for transmitting a piece of information from at least one first Ultra-Wide Band (UWB) radio tag by means of a mobile beacon including transmission and reception means, the method comprising:

transmitting a first energizing signal by a transmitter of the mobile beacon;

receiving, by the mobile beacon, by means of a UWB receiver, a first UWB signal transmitted by the first UWB radio tag energized by said first energizing signal, said first UWB signal comprising a first tag piece of data;

time stamping said reception of the first UWB signal to produce a first timestamping piece of data associated with the first piece of data;

decoding the first tag piece of data and recording the first tag piece of data decoded in a memory of the mobile beacon;

associating a first position piece of data of the mobile beacon with said first tag piece of data, said position piece of data enabling the mobile beacon to be located, said first position piece of data being determined by means of a location system, and transmitting a first piece of information by the mobile beacon comprising said first tag piece of data and the first timestamping piece of data and transmitting a second piece of information by the mobile beacon including the first position piece of data to at least one piece of equipment of a data network, the mobile beacon comprising at least two transmission antennas, each transmission antenna being configured to transmit at least one portion of the first energizing signal.

* * * * *